US012181638B2

(12) United States Patent
Tang et al.

(10) Patent No.: US 12,181,638 B2
(45) Date of Patent: Dec. 31, 2024

(54) OPTICAL IMAGING LENS ASSEMBLY

(71) Applicant: Zhejiang Sunny Optics Co., Ltd., Yuyao (CN)

(72) Inventors: Yu Tang, Yuyao (CN); Yu Zhou, Yuyao (CN); Fujian Dai, Yuyao (CN); Liefeng Zhao, Yuyao (CN)

(73) Assignee: ZHEJIANG SUNNY OPTICS CO., LTD., Yuyao (CN)

( * ) Notice: Subject to any disclaimer, the term of this patent is extended or adjusted under 35 U.S.C. 154(b) by 611 days.

(21) Appl. No.: 17/509,695

(22) Filed: Oct. 25, 2021

(65) Prior Publication Data
US 2022/0043240 A1   Feb. 10, 2022

(30) Foreign Application Priority Data
Oct. 29, 2020 (CN) .......................... 202011179016.5

(51) Int. Cl.
*G02B 13/00* (2006.01)
*G02B 9/64* (2006.01)
*G02B 13/06* (2006.01)
*G02B 27/00* (2006.01)

(52) U.S. Cl.
CPC ........... *G02B 13/0045* (2013.01); *G02B 9/64* (2013.01); *G02B 13/06* (2013.01); *G02B 27/0025* (2013.01)

(58) Field of Classification Search
CPC ...... G02B 13/0045; G02B 9/64; G02B 13/06; G02B 27/0025
USPC .................................................. 359/700, 708
See application file for complete search history.

(56) References Cited

U.S. PATENT DOCUMENTS

| | | | |
|---|---|---|---|
| 2019/0101729 A1* | 4/2019 | Hsieh | G02B 13/0045 |
| 2019/0204559 A1* | 7/2019 | Jhang | G02B 13/06 |
| 2020/0174227 A1* | 6/2020 | Nitta | G02B 9/64 |
| 2020/0285028 A1* | 9/2020 | Hirano | H04N 23/55 |
| 2021/0157092 A1* | 5/2021 | Chen | G02B 13/0045 |

FOREIGN PATENT DOCUMENTS

| | | | |
|---|---|---|---|
| CN | 105676422 A | 6/2016 | |
| CN | 107831588 A | 3/2018 | |
| CN | 109870788 A | 6/2019 | |
| CN | 110989136 A | 4/2020 | |

(Continued)

OTHER PUBLICATIONS

Office Action issued Jun. 30, 2022 in Indian Application No. 202114048428.

*Primary Examiner* — Sharrief I Broome
(74) *Attorney, Agent, or Firm* — Sughrue Mion, PLLC

(57) ABSTRACT

An optical imaging lens assembly is provided. The optical imaging lens assembly comprises, sequentially along an optical axis from an object side to an image side, a first lens having a refractive power; a second lens having a refractive power; a third lens having a refractive power; a fourth lens having a refractive power, an object-side surface of the fourth lens being a concave surface; a fifth lens having a negative refractive power, an object-side surface of the fifth lens being a convex surface; a sixth lens having a refractive power; a seventh lens having a refractive power; and an eighth lens having a refractive power, wherein a maximal field-of-view FOV of the optical imaging lens assembly and an effective focal length f of the optical imaging lens assembly satisfy: $\tan(FOV/2) \times f > 7.68$.

20 Claims, 15 Drawing Sheets

(56) References Cited

FOREIGN PATENT DOCUMENTS

| CN | 213091996 A | 4/2021 |
|----|-------------|--------|
| CN | 110244432 B | 9/2021 |
| JP | 6463592 B1 | 2/2019 |

\* cited by examiner

OPTICAL IMAGING LENS ASSEMBLY

CROSS-REFERENCE TO RELATED APPLICATIONS

This application claims the priority from Chinese Patent Application No. 202011179016.5, filed in the National Intellectual Property Administration (CNIPA) on Oct. 29, 2020, the content of which is hereby incorporated by reference in its entirety.

TECHNICAL FIELD

The present disclosure relates to the field of optical element, and particularly to an optical imaging lens assembly.

BACKGROUND

In recent years, with the rapid development of portable electronic devices such as smart phones and tablet computers, when people pursue the good performance and ultra-thin characteristic of the portable electronic devices such as the smart phones and the tablet computers, the requirements of people on the imaging performance of a miniaturized camera are also increasing day by day. Taking a mobile phone as an example, the pixels of the rear camera of the mobile phone are continuously upgraded in terms of photography. Based on the demand proposed by mobile phone providers for high pixels, the pixels of the camera of the mobile phone is already rapidly increased from 110,000 pixels in the past to tens of millions or even hundreds of millions of pixels.

SUMMARY

The present disclosure proposes an optical imaging lens assembly having a large image plane and including eight lenses, which may better meet the application requirements of main cameras on high-end smart devices in the future.

According to an aspect, the present disclosure discloses an optical imaging lens assembly. The lens assembly sequentially includes, sequentially along an optical axis from an object side to an image side: a first lens, having a refractive power; a second lens, having a refractive power; a third lens, having a refractive power; a fourth lens, having a refractive power, an object-side surface of the fourth lens being a concave surface; a fifth lens, having a negative refractive power, an object-side surface of the fifth lens being a convex surface; a sixth lens, having a refractive power; a seventh lens, having a refractive power; and an eighth lens, having a refractive power, wherein a maximal field-of-view FOV of the optical imaging lens assembly and an effective focal length f of the optical imaging lens assembly satisfy: $\tan(FOV/2) \times f > 7.68$.

In an implementation, a maximal effective radius DT61 of an object-side surface of the sixth lens and a maximal effective radius DT71 of an object-side surface of the seventh lens satisfy: $DT61/DT71 \leq 0.69$.

In an implementation, an axial distance SAG71 between an intersection point of the object-side surface of the seventh lens and the optical axis and a vertex of an effective radius of the object-side surface of the seventh lens and an axial distance SAG72 between an intersection point of an image-side surface of the seventh lens and the optical axis and a vertex of an effective radius of the image-side surface of the seventh lens satisfy: $1 < SAG72/SAG71 < 1.9$.

In an implementation, a radius of curvature R7 of the object-side surface of the fourth lens, a radius of curvature R8 of an image-side surface of the fourth lens and an effective focal length f4 of the fourth lens satisfy: $0 < |(R7+R8)/f4| < 1.4$.

In an implementation, the effective focal length f of the optical imaging lens assembly and an effective focal length f2 of the second lens satisfy: $-0.6 < f/f2 < -0.2$.

In an implementation, the effective focal length f of the optical imaging lens assembly, an effective focal length f5 of the fifth lens and an effective focal length f6 of the sixth lens satisfy: $-2 < f/(f5+f6) < -0.1$.

In an implementation, an air spacing T56 on the optical axis between the fifth lens and the sixth lens and an air spacing T67 on the optical axis between the sixth lens and the seventh lens satisfy: $0.3 < T56/T67 < 0.8$.

In an implementation, a center thickness CT7 of the seventh lens on the optical axis and a center thickness CT8 of the eighth lens on the optical axis satisfy: $0.2 < CT8/CT7 \leq 0.93$.

In an implementation, a radius of curvature R13 of the object-side surface of the seventh lens and a radius of curvature R14 of the image-side surface of the seventh lens satisfy: $0.2 < (R14-R13)/(R14+R13) < 0.8$.

In an implementation, a radius of curvature R15 of an object-side surface of the eighth lens and an effective focal length f8 of the eighth lens satisfy: $0.3 < R15/f8 < 0.9$.

In an implementation, a distance TTL on the optical axis from an object-side surface of the first lens to an image plane and half of a diagonal length ImgH of an effective pixel area on the image plane satisfy: $TTL/ImgH < 1.11$.

According to another aspect, the present disclosure discloses an optical imaging lens assembly. The lens assembly sequentially includes, sequentially along an optical axis from an object side to an image side: a first lens, having a refractive power; a second lens, having a refractive power; a third lens, having a refractive power; a fourth lens, having a refractive power, an object-side surface of the fourth lens being a concave surface; a fifth lens, having a negative refractive power, an object-side surface of the fifth lens being a convex surface; a sixth lens, having a refractive power; a seventh lens, having a refractive power; and an eighth lens, having a refractive power, wherein a distance TTL on the optical axis from an object-side surface of the first lens to an image plane and half of a diagonal length ImgH of an effective pixel area on the image plane satisfy: $TTL/ImgH < 1.11$.

In an implementation, a maximal effective radius DT61 of an object-side surface of the sixth lens and a maximal effective radius DT71 of an object-side surface of the seventh lens satisfy: $DT61/DT71 \leq 0.69$.

In an implementation, an axial distance SAG71 between an intersection point of the object-side surface of the seventh lens and the optical axis and a vertex of an effective radius of the object-side surface of the seventh lens and an axial distance SAG72 between an intersection point of an image-side surface of the seventh lens and the optical axis and a vertex of an effective radius of the image-side surface of the seventh lens satisfy: $1 < SAG72/SAG71 < 1.9$.

In an implementation, a radius of curvature R7 of the object-side surface of the fourth lens, a radius of curvature R8 of an image-side surface of the fourth lens and an effective focal length f4 of the fourth lens satisfy: $0 < |(R7+R8)/f4| < 1.4$.

In an implementation, an effective focal length f of the optical imaging lens assembly and an effective focal length f2 of the second lens satisfy: $-0.6 < f/f2 < -0.2$.

In an implementation, the effective focal length f of the optical imaging lens assembly, an effective focal length f5 of the fifth lens and an effective focal length f6 of the sixth lens satisfy: $-2<f/(f5+f6)<-0.1$.

In an implementation, an air spacing T56 on the optical axis between the fifth lens and the sixth lens and an air spacing T67 on the optical axis between the sixth lens and the seventh lens satisfy: $0.3<T56/T67<0.8$.

In an implementation, a center thickness CT7 of the seventh lens on the optical axis and a center thickness CT8 of the eighth lens on the optical axis satisfy: $0.2<CT8/CT7\leq0.93$.

In an implementation, a radius of curvature R13 of the object-side surface of the seventh lens and a radius of curvature R14 of the image-side surface of the seventh lens satisfy: $0.2<(R14-R13)/(R14+R13)<0.8$.

In an implementation, a radius of curvature R15 of an object-side surface of the eighth lens and an effective focal length f8 of the eighth lens satisfy: $0.3<R15/f8<0.9$.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION OF EMBODIMENTS

Figure 1:
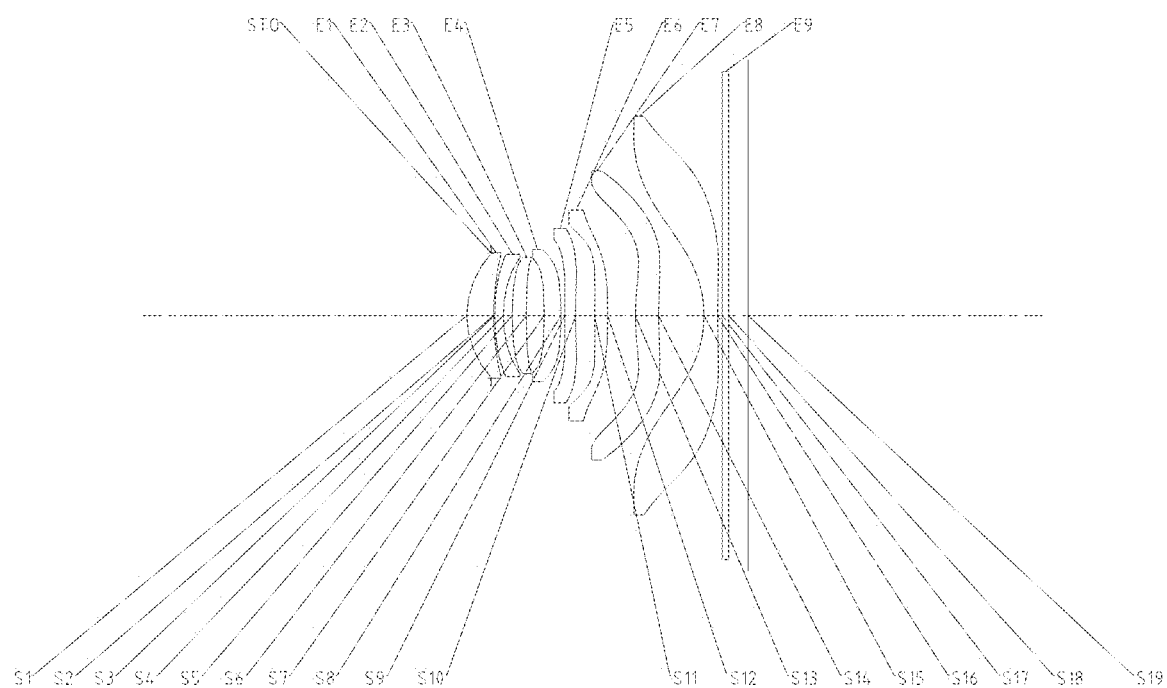
FIG. 1 is a schematic structural diagram illustrating an optical imaging lens assembly according to Embodiment 1 of the present disclosure.

For a better understanding of the present disclosure, various aspects of the present disclosure will be described in more detail with reference to the accompanying drawings. It should be understood that the detailed description is merely an illustration for the exemplary implementations of the present disclosure, rather than a limitation to the scope of the present disclosure in any way. Throughout the specification, the same reference numerals designate the same elements. The expression "and/or" includes any and all combinations of one or more of the associated listed items.

It should be noted that, in the specification, the expressions such as "first," "second," and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses are slightly exaggerated for the convenience of explanation. Particularly, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

It should be further understood that the terms "comprise," "comprising," "having," "include" and/or "including," when used in the specification, specify the presence of stated features, elements and/or components, but do not exclude the presence or addition of one or more other features, elements, components and/or combinations thereof. In addition, expressions such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. The present disclosure will be described below in detail with reference to the accompanying drawings and in combination with the embodiments.

Features, principles, and other aspects of the present disclosure are described below in detail.

An optical imaging lens assembly according to exemplary implementations of the present disclosure may include eight lenses having refractive powers, and the eight lenses are respectively a first lens, a second lens, a third lens, a fourth lens, a fifth lens, a sixth lens, a seventh lens and an eighth lens. The eight lenses are arranged in sequence along an optical axis from an object side to an image side. Any two adjacent lenses in the first to eighth lenses may have a spacing distance.

In the exemplary implementations, the first lens may have a refractive power. An object-side surface of the first lens is a convex surface, and an image-side surface of the first lens is a concave surface. The second lens has a refractive power. An object-side surface of the second lens is a convex surface, and an image-side surface of the second lens is a concave surface. The third lens has a refractive power. An object-side surface of the third lens is a convex surface, and an image-side surface of the third lens is a concave surface. The fourth lens has a refractive power. An object-side surface of the fourth lens is a concave surface. The fifth lens has a negative refractive power. An object-side surface of the fifth lens is a convex surface, and an image-side surface of the fifth lens is a concave surface. The sixth lens has a refractive power. An image-side surface of the sixth lens is a convex surface. The seventh lens has a refractive power. An object-side surface of the seventh lens is a convex surface, and an image-side surface of the seventh lens is a concave surface. The eighth lens has a refractive power. An object-side surface of the eighth lens is a concave surface.

The optical imaging lens assembly according to the present disclosure may satisfy $\tan(FOV/2)*f>7.68$. Here, FOV is a maximal field-of-view of the optical imaging lens assembly, and f is an effective focal length of the optical imaging lens assembly.

According to the optical imaging lens assembly in the present disclosure, by reasonably distributing the refractive powers and surface types of the fourth lens and the fifth lens, it may be ensured that the optical imaging lens assembly has a good processing characteristic, and thus, the optical imaging lens assembly has the advantage of a large field-of-view.

The optical imaging lens assembly according to the present disclosure may satisfy $TTL/ImgH<1.11$. Here, TTL is a distance on the optical axis from the object-side surface of the first lens to an image plane, and ImgH is half of a diagonal length of an effective pixel area on the image plane.

According to the optical imaging lens assembly in the present disclosure, by reasonably distributing the refractive powers and surface types of the fourth lens and the fifth lens and by reasonably controlling the ratio of TTL to ImgH, it may be ensured that the system has a good processing characteristic while having a large image plane.

In the exemplary implementations, the optical imaging lens assembly according to the present disclosure may satisfy $DT61/DT71 \leq 0.69$. Here, DT61 is a maximal effective radius of an object-side surface of the sixth lens, and DT71 is a maximal effective radius of the object-side surface of the seventh lens. By limiting the maximal effective radii of the object-side surfaces of the sixth lens and the seventh lens within a reasonable range, the size of the lens assembly may be reduced, thereby satisfying the miniaturization of the lens assembly and improving the resolution.

In the exemplary implementations, the optical imaging lens assembly according to the present disclosure may satisfy $1<SAG72/SAG71<1.9$. Here, SAG71 is an axial distance between an intersection point of the object-side surface of the seventh lens and the optical axis and a vertex of an effective radius of the object-side surface of the seventh lens, and SAG72 is an axial distance between an intersection point of the image-side surface of the seventh lens and the optical axis and a vertex of an effective radius of the image-side surface of the seventh lens. By reasonably controlling the ratio of the axial distance between the intersection point of the object-side surface of the seventh lens and the optical axis and the vertex of the effective radius of the object-side surface of the seventh lens to the axial distance between the intersection point of the image-side surface of the seventh lens and the optical axis and the vertex of the effective radius of the image-side surface of the seventh lens within a certain range to adjust a chief ray angle of the optical imaging lens assembly, the relative luminance of the optical imaging lens assembly may be effectively improved, thereby enhancing the definition of the image plane.

In the exemplary implementations, the optical imaging lens assembly according to the present disclosure may satisfy $0<|(R7+R8)/f4|<1.4$. Here, R7 is a radius of curvature of the object-side surface of the fourth lens, R8 is a radius of curvature of an image-side surface of the fourth lens, and f4 is an effective focal length of the fourth lens. By constraining the sum of the radii of curvature of the object-side surface and the image-side surface of the fourth lens and the effective focal length of the fourth lens within a certain range, the amount of optical distortion may be reduced, which ensures a good imaging quality.

In the exemplary implementations, the optical imaging lens assembly according to the present disclosure may satisfy $-0.6<f/f2<-0.2$. Here, f is the effective focal length of the optical imaging lens assembly, and f2 is an effective focal length of the second lens. By reasonably controlling the effective focal lengths of the optical imaging lens assembly and the second lens, the optical sensitivity of the second lens may be effectively reduced, which is more conductive to achieving mass production.

In the exemplary implementations, the optical imaging lens assembly according to the present disclosure may satisfy $-2<f/(f5+f6)<-0.1$. Here, f is the effective focal length of the optical imaging lens assembly, f5 is an effective focal length of the fifth lens, and f6 is an effective focal length of the sixth lens. By reasonably controlling the effective focal lengths of the optical imaging lens assembly, the fifth lens and the sixth lens, the refractive power of the optical imaging lens assembly may be reasonably distributed, thereby effectively improving the aberration of the optical imaging lens assembly.

In the exemplary implementations, the optical imaging lens assembly according to the present disclosure may satisfy $0.3<T56/T67<0.8$. Here, T56 is an air spacing on the optical axis between the fifth lens and the sixth lens, and T67 is an air spacing on the optical axis between the sixth lens and the seventh lens. By constraining the air spacing on the optical axis between the fifth lens and the sixth lens and the air spacing on the optical axis between the sixth lens and the seventh lens, the curvature of field produced by the lens in the front of the optical imaging lens assembly and the curvature of field produced by the lens in the back of the optical imaging lens assembly may be balanced, such that the system has a reasonable curvature of field.

In the exemplary implementations, the optical imaging lens assembly according to the present disclosure may satisfy $0.2<CT8/CT7\leq0.93$. Here, CT7 is a center thickness of the seventh lens on the optical axis, and CT8 is a center thickness of the eighth lens on the optical axis. By constraining the ratio of the center thickness of the seventh lens on the optical axis to the center thickness of the eighth lens on the optical axis within a certain range, it may be ensured that the optical imaging lens assembly has a good processing characteristic.

In the exemplary implementations, the optical imaging lens assembly according to the present disclosure may satisfy $0.2<(R14-R13)/(R14+R13)<0.8$. Here, R13 is a radius of curvature of the object-side surface of the seventh lens, and R14 is a radius of curvature of the image-side surface of the seventh lens. By reasonably controlling the radii of curvature of the object-side surface and the image-side surface of the seventh lens, it is beneficial to ensure that the seventh lens has a reasonable refractive power, and at the same time, the angle between the chief ray and the optical axis when the chief ray is incident on the image plane is reduced, thereby improving the illuminance of the image plane.

In the exemplary implementations, the optical imaging lens assembly according to the present disclosure may satisfy $0.3<R15/f8<0.9$. Here, R15 is a radius of curvature of the object-side surface of the eighth lens, and f8 is an effective focal length of the eighth lens. By reasonably controlling the radius of curvature of the object-side surface of the eighth lens and the effective focal length of the eighth lens within a certain range, the axial aberration produced by the optical imaging lens assembly may be effectively balanced.

In the implementations of the present disclosure, at least one of the surfaces of the lenses is an aspheric surface. That is, at least one of the surfaces from the object-side surface of the first lens to the image-side surface of the eighth lens is an aspheric surface. The aspheric lens is characterized in that the curvature continuously changes from the center of the lens to the periphery. Different from a spherical lens having a constant curvature from the center of the lens to the periphery, the aspheric lens has a better radius-of-curvature characteristic, and has advantages of improving the distortion aberration and the astigmatic aberration. The use of the aspheric lens may eliminate as much as possible the aberrations that occur during the imaging, thereby improving the imaging quality. Alternatively, at least one of the object-side surface and the image-side surface of each of the first lens, the second lens, the third lens, the fourth lens, the fifth lens, the sixth lens, the seventh lens and the eighth lens is an aspheric surface. Alternatively, the object-side surface and the image-side surface of each of the first lens, the second lens, the third lens, the fourth lens, the fifth lens, the sixth lens, the seventh lens and the eighth lens are aspheric surfaces.

However, it should be understood by those skilled in the art that the various results and advantages described in the present specification may be obtained by changing the number of the lenses constituting the optical imaging lens assembly without departing from the technical solution claimed by the present disclosure. For example, although the optical imaging lens assembly having eight lenses is described as an example in the implementations, the optical imaging lens assembly is not limited to the eight lenses. If desired, the optical imaging lens assembly may also include other numbers of lenses.

Particular embodiments of the optical imaging lens assembly that may be applied to the above implementations are further described below with reference to the accompanying drawings.

Embodiment 1

An optical imaging lens assembly according to Embodiment 1 of the present disclosure is described below with reference to FIGS. 1-5. FIG. 1 is a schematic structural diagram illustrating the optical imaging lens assembly according to Embodiment 1 of the present disclosure.

As shown in FIG. 1, the optical imaging lens assembly includes, sequentially from an object side to an image side, a first lens E1, a second lens E2, a diaphragm STO, a third lens E3, a fourth lens E4, a fifth lens E5, a sixth lens E6, a seventh lens E7, an eighth lens E8, an optical filter E9 and an image plane S19.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a concave surface, and an image-side surface S8 of the fourth lens E4 is a convex surface. The fifth lens E5 has a negative refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a convex surface. The seventh lens E7 has a positive refractive power, an object-side surface S13 of the seventh lens E7 is a convex surface, and an image-side surface S14 of the seventh lens E7 is a concave surface. The eighth lens E8 has a negative refractive power, an object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the surfaces S1-S18 and finally forms an image on the image plane S19.

Table 1 is a table showing basic parameters of the optical imaging lens assembly in Embodiment 1. Here, the units of a radius of curvature and a thickness/distance are both millimeters (mm).

TABLE 1

| surface number | surface type | radius of curvature | thickness | refractive index/ abbe number | conic coefficient |
|---|---|---|---|---|---|
| OBJ | spherical | infinite | infinite | | |
| STO | spherical | infinite | −0.7765 | | |
| S1 | aspheric | 2.9484 | 0.8580 | 1.55/56.11 | −0.0147 |
| S2 | aspheric | 8.5260 | 0.0318 | | 1.1206 |
| S3 | aspheric | 6.4596 | 0.2800 | 1.68/19.25 | −0.1630 |
| S4 | aspheric | 4.2109 | 0.2800 | | 0.0733 |
| S5 | aspheric | 8.1738 | 0.4526 | 1.55/56.11 | 14.3016 |
| S6 | aspheric | 14.6969 | 0.5770 | | 4.2498 |
| S7 | aspheric | −21.3287 | 0.5343 | 1.57/37.31 | 54.6191 |
| S8 | aspheric | −13.7734 | 0.1285 | | 14.1718 |
| S9 | aspheric | 26.2361 | 0.3419 | 1.68/19.25 | 59.8019 |
| S10 | aspheric | 12.4547 | 0.6073 | | 3.9191 |
| S11 | aspheric | 29.7565 | 0.4204 | 1.57/37.31 | −99.0000 |
| S12 | aspheric | −23.1974 | 0.8823 | | 1.2733 |
| S13 | aspheric | 6.8367 | 0.7421 | 1.55/56.11 | −0.5741 |
| S14 | aspheric | 18.2002 | 1.4624 | | −45.0314 |
| S15 | aspheric | −3.6224 | 0.4304 | 1.54/55.65 | −1.3806 |

TABLE 1-continued

| surface number | surface type | radius of curvature | thickness | refractive index/ abbe number | conic coefficient |
|---|---|---|---|---|---|
| S16 | aspheric | 15.9823 | 0.1506 | | 0.3701 |
| S17 | spherical | infinite | 0.2100 | 1.52/64.17 | |
| S18 | spherical | infinite | 0.6166 | | |
| S19 | spherical | infinite | infinite | | |

In this embodiment, a total track length TTL of the optical imaging lens assembly (i.e., a distance on an optical axis from the object-side surface S1 of the first lens E1 to the image plane S19 of the optical imaging lens assembly) is 8.15 mm, and half of a diagonal length ImgH of an effective pixel area on the image plane S19 of the optical imaging lens assembly is 8.25 mm. A total effective focal length f of the optical imaging lens assembly is 8.00 mm, a maximal field-of-view FOV of the optical imaging lens assembly is 45.15°, and an F-number Fno is 1.98.

In Embodiment 1, the object-side surface and the image-side surface of any lens in the first to eighth lenses E1-E8 are both aspheric surfaces, and the surface type x of each aspheric surface may be defined using, but not limited to, the following formula:

$$x = \frac{ch^2}{1+\sqrt{1-(k+1)c^2h^2}} + \sum A_i h^i. \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient; and Ai is the correction coefficient of an i-th order of the aspheric surface.

Table 2 below shows the high-order coefficients A4, A6, A8, A10, A12, A14, A16, A18 and A20 applicable to the aspheric surfaces S1-S16 in Embodiment 1.

TABLE 2

| surface number | A4 | A6 | A8 | A10 | A12 | A14 | A16 | A18 | A20 |
|---|---|---|---|---|---|---|---|---|---|
| S1 | −1.8853E−05 | 1.6253E−03 | −2.9703E−03 | 3.2100E−03 | −2.1061E−03 | 8.3744E−04 | −1.9843E−04 | 2.5771E−05 | −1.4160E−06 |
| S2 | 2.6431E−03 | −3.2878E−03 | −1.5257E−03 | 4.4228E−03 | −3.4796E−03 | 1.5176E−03 | −3.9022E−01 | 5.5095E−05 | −3.2986E−06 |
| S3 | 3.9473E−03 | −5.0978E−03 | 1.6156E−03 | 1.6397E−03 | −1.8331E−03 | 9.2082E−04 | −2.6395E−04 | 4.0793E−05 | −2.6305E−06 |
| S4 | 3.9582E−03 | −1.1889E−03 | 1.2242E−03 | −3 6647E−04 | 1.2923E−04 | 5.4293E−06 | −2.4094E−05 | 7.5817E−06 | −8.3508E−07 |
| S5 | −2.8431E−03 | −1.4936E−03 | 1.7413E−03 | −1.1357E−03 | 5.9637E−04 | −1.9511E−04 | 4.8151E−05 | −7.4290E−06 | 4.7702E−07 |
| S6 | −2.1336E−03 | −1.3293E−03 | 3.5855E−03 | −5 3223E−03 | 4.8827E−03 | −2.6669E−03 | 8.7092E−04 | −1 5607E−04 | 1.1947E−05 |
| S7 | −5.9553E−03 | −7.2590E−03 | 2.5390E−03 | −3.7277E−04 | −8.7127E−04 | 7.3506E−04 | −2.7613E−04 | 5.2048E−05 | −4.0235E−06 |
| S8 | 3.6750E−03 | −1.9537E−02 | 1.5417E−02 | −1.0370E−02 | 5.0397E−03 | −1.6870E−03 | 3.6232E−04 | −4.4458E−05 | 2.3557E−06 |
| S9 | −7.0407E−03 | −1.2421E−02 | 9.4818E−03 | −3.8327E−03 | 9.6609E−04 | −1.6072E−04 | 1.7709E−05 | −1.2124E−06 | 3.8971E−08 |
| S10 | −1.4147E−02 | −3.4173E−03 | 2.9637E−03 | −8.6210E−04 | 1.1547E−04 | −3.2287E−06 | −1.1034E−06 | 1.4144E−07 | −5.4582E−09 |
| S11 | −1.7533E−03 | −4.7157E−03 | 1.5793E−03 | −2.4356E−04 | 4.7678E−05 | 2.7320E−05 | −4.8900E−06 | 4.0413E−07 | −1.2856E−08 |
| S12 | −5.4510E−03 | −3.2599E−03 | 1.6890E−03 | −4.4709E−04 | 6.2261E−05 | −3.8282E−06 | 7.0371E−10 | 1.0442E−08 | −3.3618E−10 |
| S13 | −7.0207E−03 | −2.8510E−03 | 2.7166E−04 | 4.9856E−05 | −1.3610E−05 | 1.3463E−06 | −6.8455E−08 | 1.7877E−09 | −1.9099E−11 |
| S14 | 6.9948E−03 | −4.7028E−03 | 6.5817E−04 | −3.8687E−05 | −6.3398E−08 | 1.3845E−07 | −7.6065E−09 | 1.6811E−10 | −1.2814E−12 |
| S15 | 1.5096E−03 | −1.4348E−03 | 2.5974E−01 | −2.1089E−05 | 9.8835E−07 | −2.8705E−08 | 5.1368E−10 | −5.2142E−12 | 2.3019E−14 |
| S16 | −6.9942E−03 | −7.1056E−05 | 9.3946E−05 | −1.1192E−05 | 6.7715E−07 | −2.3996E−08 | 5.0066E−10 | −5.6695E−12 | 2.6761E−14 |

Figure 2:
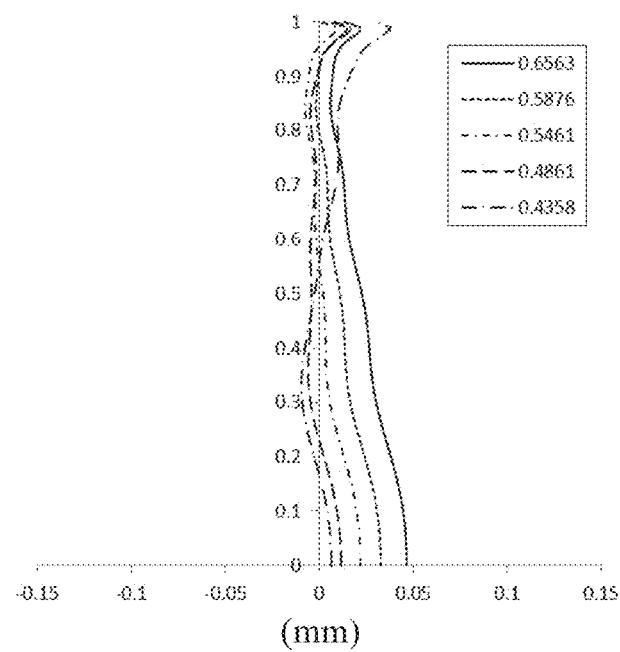
FIG. 2 illustrates a longitudinal aberration curve of the optical imaging lens assembly according to Embodiment 1 of the present disclosure.
Figure 3:
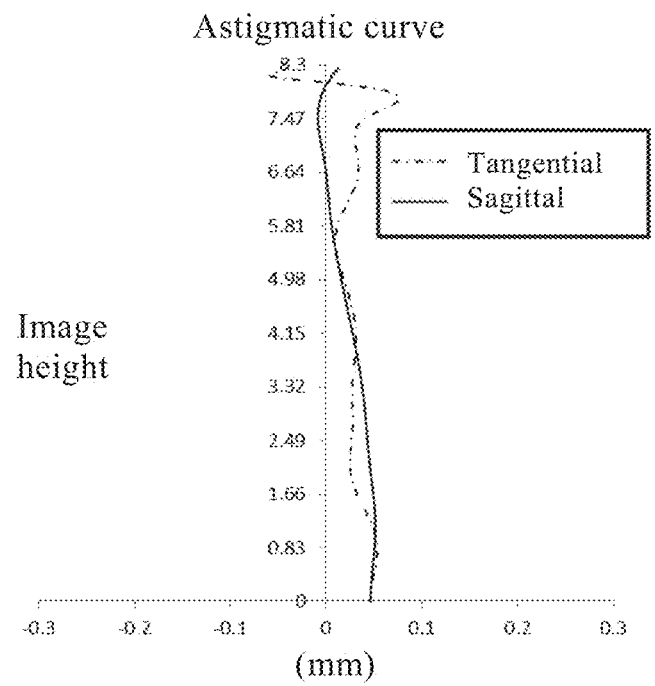
FIG. 3 illustrates an astigmatic curve of the optical imaging lens assembly according to Embodiment 1 of the present disclosure.
Figure 4:
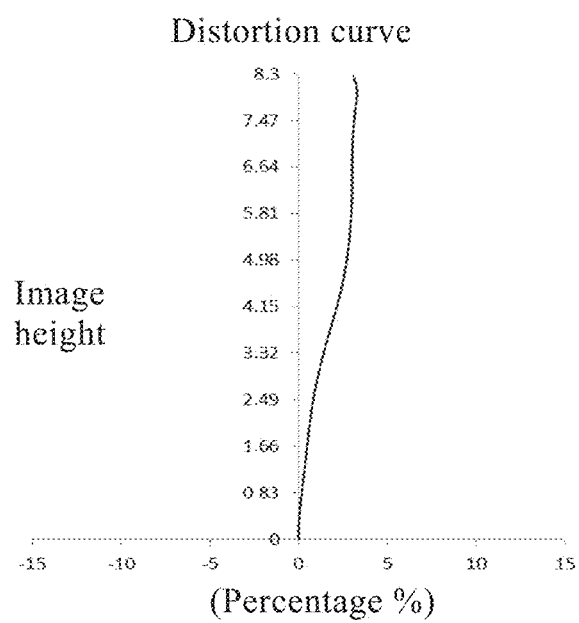
FIG. 4 illustrates a distortion curve of the optical imaging lens assembly according to Embodiment 1 of the present disclosure.
Figure 5:
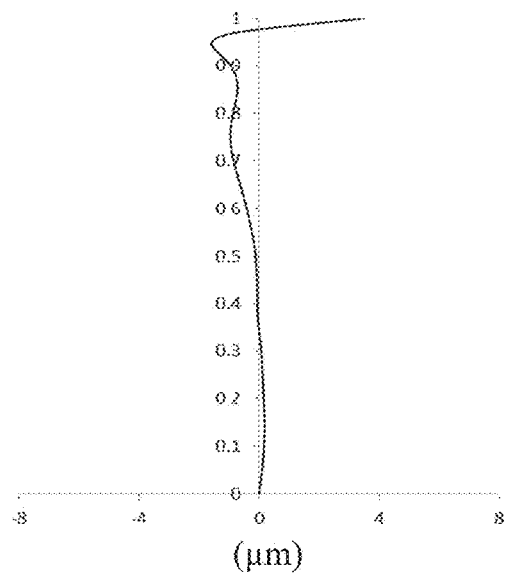
FIG. 5 illustrates a lateral color curve of the optical imaging lens assembly according to Embodiment 1 of the present disclosure.

FIG. 2 illustrates a longitudinal aberration curve of the optical imaging lens assembly according to Embodiment 1, representing deviations of focal points of light of different wavelengths converged after passing through the lens assembly. FIG. 3 illustrates an astigmatic curve of the optical imaging lens assembly according to Embodiment 1, representing a curvature of a tangential image plane and a curvature of a sagittal image plane. FIG. 4 illustrates a distortion curve of the optical imaging lens assembly according to Embodiment 1, representing amounts of distortion corresponding to different image heights. FIG. 5 illustrates a lateral color curve of the optical imaging lens assembly according to Embodiment 1, representing deviations of different image heights on the image plane after light passes through the lens assembly. It may be seen from FIGS. 2-5 that the optical imaging lens assembly according to Embodiment 1 may achieve a good imaging quality.

Embodiment 2

Figure 6:
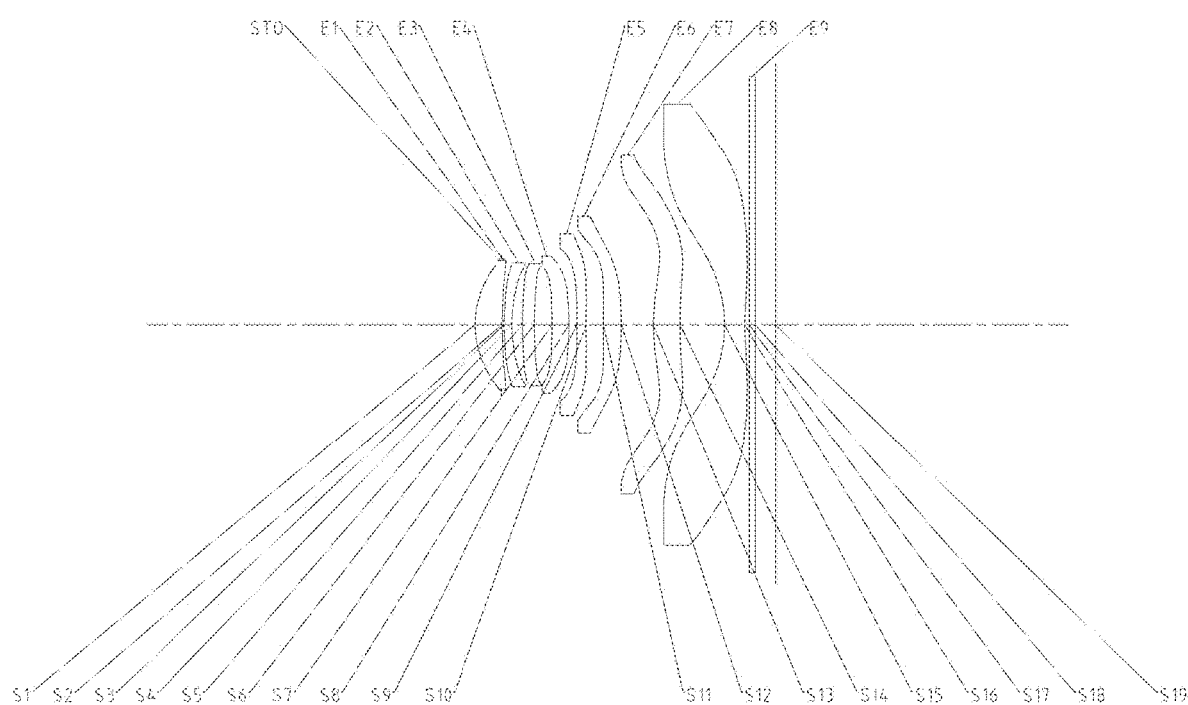
FIG. 6 is a schematic structural diagram illustrating an optical imaging lens assembly according to Embodiment 2 of the present disclosure.

An optical imaging lens assembly according to Embodiment 2 of the present disclosure is described below with reference to FIGS. 6-10. FIG. 6 is a schematic structural diagram illustrating the optical imaging lens assembly according to Embodiment 2 of the present disclosure.

As shown in FIG. 6, the optical imaging lens assembly includes, sequentially from an object side to an image side, a first lens E1, a second lens E2, a diaphragm STO, a third lens E3, a fourth lens E4, a fifth lens E5, a sixth lens E6, a seventh lens E7, an eighth lens E8, an optical filter E9 and an image plane S19.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a concave surface, and an image-side surface S8 of the fourth lens E4 is a convex surface. The fifth lens E5 has a negative refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a convex surface. The seventh lens E7 has a positive refractive power, an object-side surface S13 of the seventh lens E7 is a convex surface, and an image-side surface S14 of the seventh lens E7 is a concave surface. The eighth lens E8 has a negative refractive power, an object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the surfaces S1-S18 and finally forms an image on the image plane S19.

Table 3 is a table showing basic parameters of the optical imaging lens assembly in Embodiment 2. Here, the units of a radius of curvature and a thickness/distance are both millimeters (mm).

TABLE 3

| surface number | surface type | radius of curvature | thickness | refractive index/ abbe number | conic coefficient |
|---|---|---|---|---|---|
| OBJ | spherical | infinite | infinite | | |
| STO | spherical | infinite | −0.8300 | | |
| S1 | aspheric | 3.0801 | 0.8470 | 1.55/56.11 | 0.0102 |
| S2 | aspheric | 13.7554 | 0.0600 | | −5.6013 |
| S3 | aspheric | 10.1565 | 0.2500 | 1.68/19.25 | 0.8845 |
| S4 | aspheric | 5.8509 | 0.3242 | | −0.0893 |
| S5 | aspheric | 12.4174 | 0.3714 | 1.55/56.11 | 13.8043 |
| S6 | aspheric | 11.7521 | 0.5152 | | −11.4515 |
| S7 | aspheric | −32.1342 | 0.5697 | 1.57/37.31 | 0.0000 |
| S8 | aspheric | −13.5467 | 0.2480 | | 0.0000 |
| S9 | aspheric | 124.8417 | 0.2893 | 1.68/19.25 | 0.0000 |
| S10 | aspheric | 15.4389 | 0.5433 | | 0.0000 |
| S11 | aspheric | 82.4187 | 0.5589 | 1.57/37.31 | 0.0000 |
| S12 | aspheric | −14.3649 | 0.9949 | | 0.0000 |
| S13 | aspheric | 6.0264 | 0.8426 | 1.55/56.11 | −0.9341 |
| S14 | aspheric | 20.0539 | 1.3939 | | 0.0000 |
| S15 | aspheric | −4.1931 | 0.6288 | 1.54/55.65 | −1.3102 |
| S16 | aspheric | 12.5790 | 0.1414 | | 0.0000 |
| S17 | spherical | infinite | 0.2100 | 1.52/64.17 | |
| S18 | spherical | infinite | 0.6302 | | |
| S19 | spherical | infinite | infinite | | |

Table 4 below shows the high-order coefficients A4, A6, A8, A10, A12, A14, A16, A18 and A20 applicable to the aspheric surfaces S1-S16 in Embodiment 2.

TABLE 4

| surface number | A4 | A6 | A8 | A10 | A12 | A14 | A16 | A18 | A20 |
|---|---|---|---|---|---|---|---|---|---|
| S1 | −1.3545E−04 | 1.4903E−03 | −1.9878E−03 | 1.5793E−03 | −7.8708E−04 | 2.4375E−04 | −4.6035E−05 | 4.8638E−06 | −2.2734E−07 |
| S2 | −5.6010E−04 | −3.9747E−03 | 5.5893E−03 | −4.1917E−03 | 2.0248E−03 | −6.4006E−04 | 1.2657E−04 | −1.4189E−05 | 6.8707E−07 |
| S3 | 2.9118E−03 | −4.2241E−03 | 5.7809E−03 | −3.9572E−03 | 1.7924E−03 | −5.3797E−04 | 1.0102E−04 | −1.0730E−05 | 5.0407E−07 |
| S4 | 5.5042E−03 | −1.7495E−03 | 2.1827E−03 | −8.0436E−04 | −9.7259E−05 | 2.6615E−04 | −1.2462E−04 | 2.6029E−05 | −2.0904E−06 |
| S5 | −5.5896E−03 | 1.2573E−03 | −2.7617E−03 | 4.4720E−03 | −3.6474E−03 | 1.8364E−03 | −5.5480E−04 | 9.2664E−05 | −6.5580E−06 |
| S6 | −3.7667E−03 | 1.6384E−03 | −3.8576E−03 | 5.6382E−03 | −4.4706E−03 | 2.1960E−03 | −6.4728E−04 | 1.0508E−04 | −7.1453E−06 |
| S7 | −7.8943E−03 | −2.0250E−03 | −2.3298E−03 | 2.5366E−03 | −1.5532E−03 | 5.0718E−04 | −7.2381E−05 | −9.8521E−07 | 9.8191E−07 |
| S8 | −2.6757E−03 | −9.0733E−03 | 7.1656E−03 | −5.3788E−03 | 2.6333E−03 | −8.4133E−04 | 1.7157E−04 | −2.0355E−05 | 1.0677E−06 |
| S9 | −1.4303E−02 | −4.4198E−03 | 3.6852E−03 | −8.9098E−04 | −2.5386E−04 | 2.1938E−04 | −5.7906E−05 | 7.0711E−06 | −3.4059E−07 |
| S10 | −1.5354E−02 | −4.3722E−03 | 4.6302E−03 | −2.0350E−03 | 5.2836E−04 | −8.2109E−05 | 7.1206E−06 | −2.8775E−07 | 2.9314E−09 |
| S11 | −2.3607E−03 | −5.1041E−03 | 1.5606E−03 | 4.8599E−04 | −8.3049E−04 | 4.5699E−04 | −1.4885E−04 | 3.1382E−05 | −4.3170E−06 |
| S12 | −4.9683E−03 | −4.4006E−03 | 2.9548E−03 | −1.2289E−03 | 3.4750E−04 | −6.5348E−05 | 7.4242E−06 | −3.5522E−07 | −1.9931E−08 |
| S13 | −3.7977E−03 | −2.3144E−03 | 4.0452E−04 | −3.7009E−05 | 2.0061E−06 | −6.1507E−08 | 9.2716E−10 | −3.41471E−12 | −4.1514E−14 |
| S14 | 6.1856E−03 | −3.0871E−03 | 2.9918E−04 | 1.2719E−05 | −6.8846E−06 | 9.1662E−07 | −7.0370E−08 | 3.4773E−09 | −1.1263E−10 |
| S15 | −7.5325E−05 | −9.3505E−04 | 2.2619E−04 | −2.6445E−05 | 2.2105E−06 | −1.3895E−07 | 6.3094E−09 | −1.9899E−10 | 4.2141E−12 |
| S16 | −4.6387E−03 | −6.6559E−04 | 2.4773E−04 | −3.6545E−05 | 3.2711E−06 | −1.9415E−07 | 7.8547E−09 | −2.1724E−10 | 4.0372E−12 |

Figure 7:
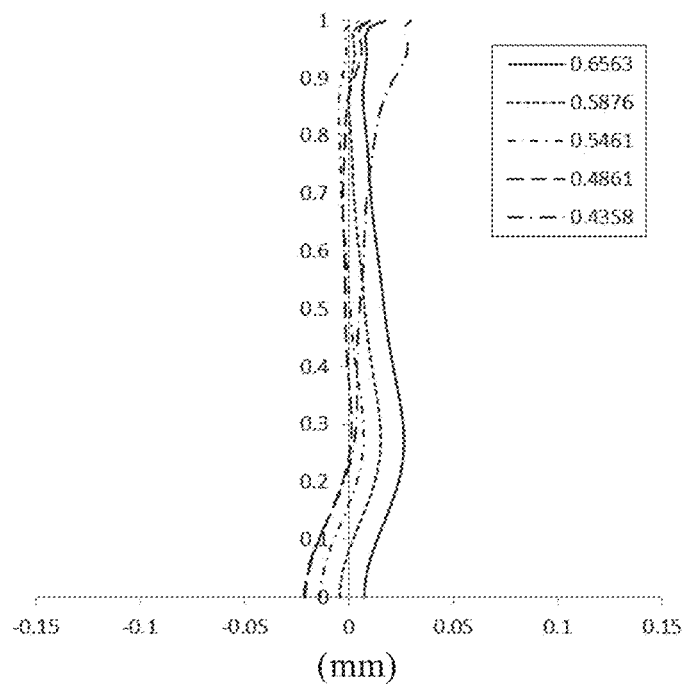
FIG. 7 illustrates a longitudinal aberration curve of the optical imaging lens assembly according to Embodiment 2 of the present disclosure.
Figure 8:
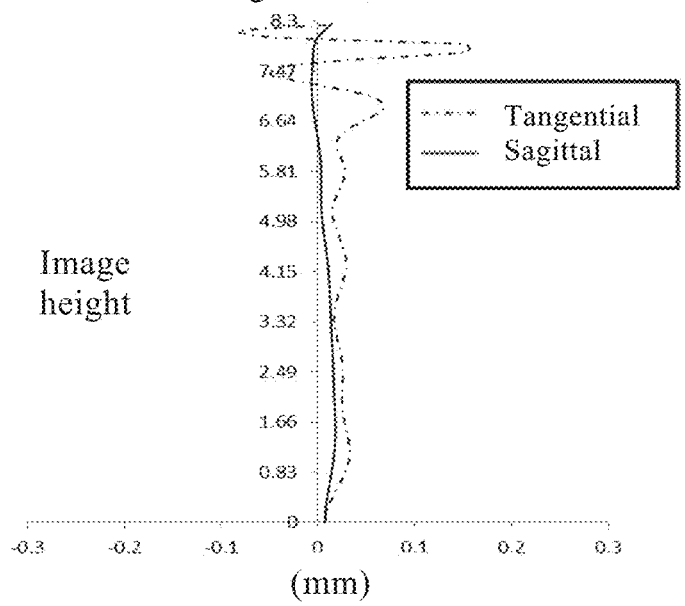
FIG. 8 illustrates an astigmatic curve of the optical imaging lens assembly according to Embodiment 2 of the present disclosure.
Figure 9:
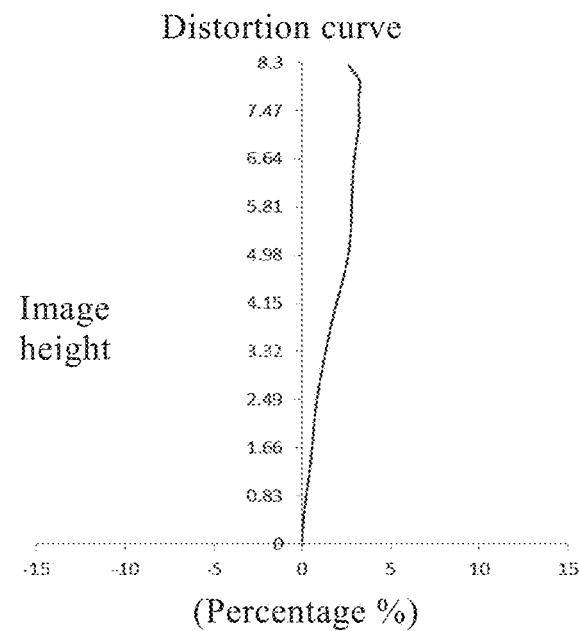
FIG. 9 illustrates a distortion curve of the optical imaging lens assembly according to Embodiment 2 of the present disclosure.
Figure 10:
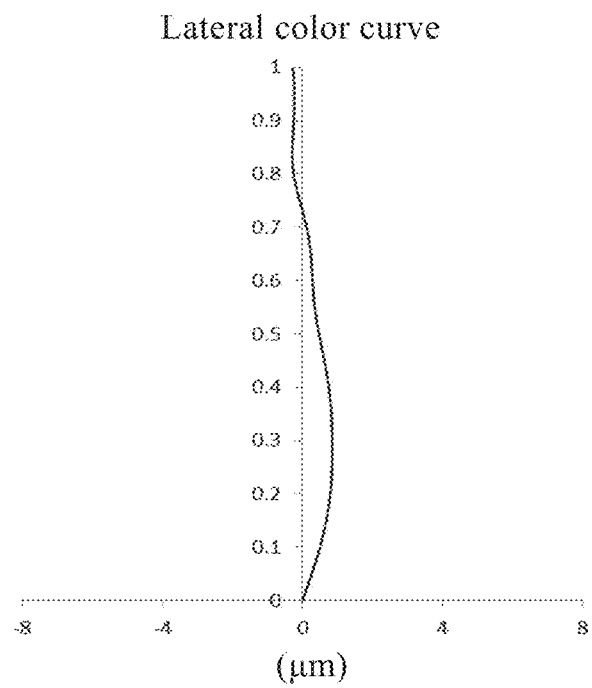
FIG. 10 illustrates a lateral color curve of the optical imaging lens assembly according to Embodiment 2 of the present disclosure.

FIG. 7 illustrates a longitudinal aberration curve of the optical imaging lens assembly according to Embodiment 2, representing deviations of focal points of light of different wavelengths converged after passing through the lens assembly. FIG. 8 illustrates an astigmatic curve of the optical imaging lens assembly according to Embodiment 2, representing a curvature of a tangential image plane and a curvature of a sagittal image plane. FIG. 9 illustrates a distortion curve of the optical imaging lens assembly according to Embodiment 2, representing amounts of distortion corresponding to different image heights. FIG. 10 illustrates a lateral color curve of the optical imaging lens assembly according to Embodiment 2, representing deviations of different image heights on the image plane after light passes through the lens assembly. It may be seen from FIGS. 7-10 that the optical imaging lens assembly according to Embodiment 2 may achieve a good imaging quality.

Embodiment 3

Figure 11:
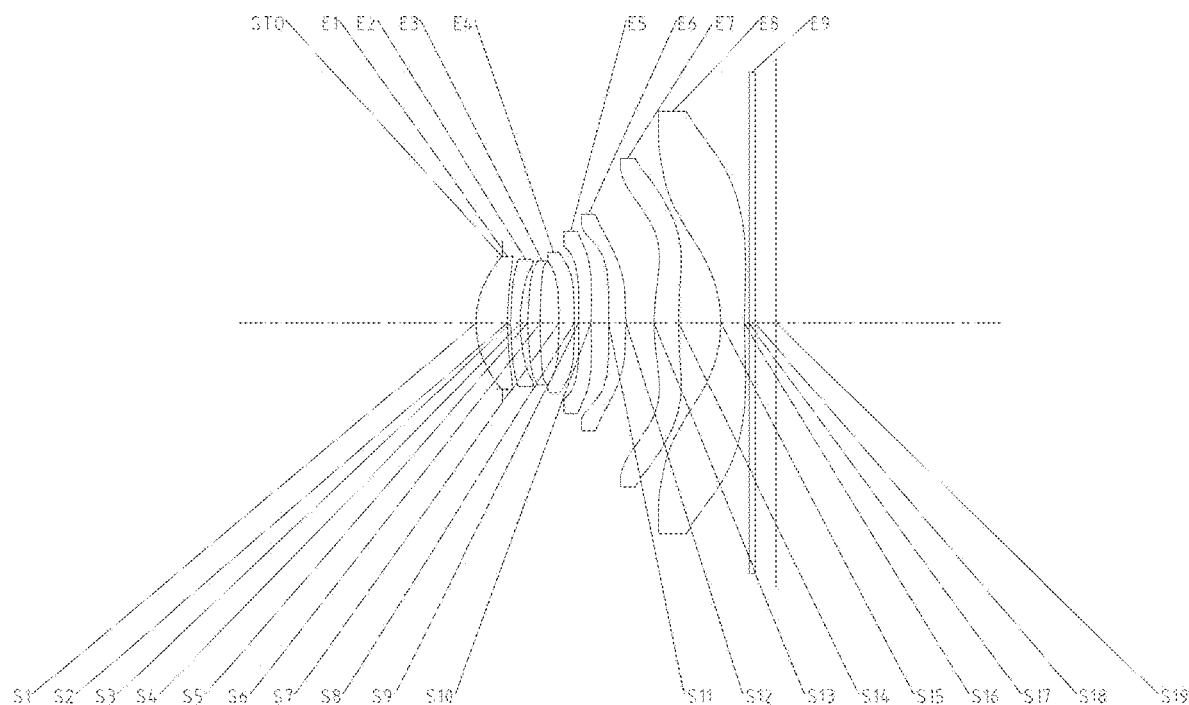
FIG. 11 is a schematic structural diagram illustrating an optical imaging lens assembly according to Embodiment 3 of the present disclosure.

An optical imaging lens assembly according to Embodiment 3 of the present disclosure is described below with reference to FIGS. 11-15. FIG. 11 is a schematic structural diagram illustrating the optical imaging lens assembly according to Embodiment 3 of the present disclosure.

As shown in FIG. 11, the optical imaging lens assembly includes, sequentially from an object side to an image side, a first lens E1, a second lens E2, a diaphragm STO, a third lens E3, a fourth lens E4, a fifth lens E5, a sixth lens E6, a seventh lens E7, an eighth lens E8, an optical filter E9 and an image plane S19.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a concave surface. The fourth lens E4 has a negative refractive power, an object-side surface S7 of the fourth lens E4 is a concave surface, and an image-side surface S8 of the fourth lens E4 is a convex surface. The fifth lens E5 has a negative refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a convex surface. The seventh lens E7 has a positive refractive power, an object-side surface S13 of the seventh lens E7 is a convex surface, and an image-side surface S14 of the seventh lens E7 is a concave surface. The eighth lens E8 has a negative refractive power, an object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the surfaces S1-S18 and finally forms an image on the image plane S19.

Table 5 is a table showing basic parameters of the optical imaging lens assembly in Embodiment 3. Here, the units of a radius of curvature and a thickness/distance are both millimeters (mm).

TABLE 5

| surface number | surface type | radius of curvature | thickness | refractive index/ abbe number | conic coefficient |
|---|---|---|---|---|---|
| OBJ | spherical | infinite | infinite | | |
| STO | spherical | infinite | −0.8300 | | |
| S1 | aspheric | 3.0502 | 0.9786 | 1.55/56.11 | 0.0055 |
| S2 | aspheric | 10.2384 | 0.1014 | | −2.8216 |
| S3 | aspheric | 11.2307 | 0.3071 | 1.68/19.25 | −0.7160 |
| S4 | aspheric | 5.9011 | 0.2293 | | −0.3192 |
| S5 | aspheric | 8.8930 | 0.3886 | 1.55/56.11 | 13.5190 |
| S6 | aspheric | 16.1717 | 0.5803 | | −9.3572 |
| S7 | aspheric | −20.8297 | 0.4931 | 1.57/37.31 | 0.0000 |
| S8 | aspheric | −22.6475 | 0.1322 | | 0.0000 |
| S9 | aspheric | 32.6129 | 0.3806 | 1.68/19.25 | 0.0000 |
| S10 | aspheric | 14.8748 | 0.5528 | | 0.0000 |
| S11 | aspheric | 187.8094 | 0.5486 | 1.57/37.31 | 0.0000 |
| S12 | aspheric | −12.7302 | 0.8700 | | 0.0000 |
| S13 | aspheric | 6.1995 | 0.7741 | 1.55/56.11 | −0.8611 |
| S14 | aspheric | 19.8919 | 1.3217 | | 0.0000 |
| S15 | aspheric | −4.0304 | 0.7200 | 1.54/55.65 | −1.3213 |
| S16 | aspheric | 14.0522 | 0.1585 | | 0.0000 |
| S17 | spherical | infinite | 0.2100 | 1.52/64.17 | |
| S18 | spherical | infinite | 0.6511 | | |
| S19 | spherical | infinite | infinite | | |

Table 6 below shows the high-order coefficients A4, A6, A8, A10, A12, A14, A16, A18 and A20 applicable to the aspheric surfaces S11-S16 in Embodiment 3.

TABLE 6

| surface number | A4 | A6 | A8 | A10 | A12 | A14 | A16 | A18 | A20 |
|---|---|---|---|---|---|---|---|---|---|
| S1 | 1.3923E−04 | 1.7817E−04 | 2.7409E−04 | −5.9912E−04 | 4.5939E−04 | −1.9122E−04 | 4.4852E−05 | −5.5851E−06 | 2.8239E−07 |
| S2 | 8.0552E−04 | −2.0706E−03 | 4.1056E−04 | 7.6374E−04 | −7.3528E−04 | 3.3669E−04 | −8.7498E−05 | 1.2026E−05 | −6.7704E−07 |
| S3 | 3.2326E−03 | −3.1398E−03 | 1.6214E−03 | 1.8738E−04 | −4.4322E−04 | 2.1753E−04 | −5.7277E−05 | 7.8132E−06 | −4.1911E−07 |
| S4 | 6.2465E−03 | −4.9379E−03 | 6.6036E−03 | −5.6425E−03 | 3.5496E−03 | −1.4537E−03 | 3.6745E−04 | −5.2140E−05 | 3.1455E−06 |
| S5 | −3.0361E−03 | −1.4721E−03 | 1.0308E−04 | 1.2630E−03 | −1.3455E−03 | 7.9081E−04 | −2.5458E−04 | 4.3412E−05 | −3.0840E−06 |
| S6 | −2.8457E−03 | 2.4962E−03 | −6.3879E−03 | 8.2757E−03 | −6.2177E−03 | 2.9004E−03 | −8.0486E−04 | 1.2169E−04 | −7.5903E−06 |
| S7 | −2.1349E−03 | −1.7294E−02 | 2.0731E−02 | −1.9554E−02 | 1.1962E−02 | −4.7529E−03 | 1.1878E−03 | −1.7007E−04 | 1.0661E−05 |
| S8 | 8.0939E−03 | −3.4289E−02 | 3.5241E−02 | −2.3629E−02 | 1.0120E−02 | −2.8155E−03 | 4.9794E−04 | −5.1297E−05 | 2.3591E−06 |
| S9 | −7.1605E−03 | −2.4825E−02 | 2.5864E−02 | −1.4145E−02 | 4.6551E−03 | −9.4376E−04 | 1.1373E−04 | −7.2895E−06 | 1.7942E−07 |
| S10 | −1.3835E−02 | −9.7975E−03 | 9.8321E−03 | −4.6329E−03 | 1.3216E−03 | −2.3760E−04 | 2.6212E−05 | −1.6145E−06 | 4.2409E−08 |
| S11 | 1.5026E−03 | −1.3469E−02 | 1.2202E−02 | −8.2460E−03 | 3.9520E−03 | −1.3294E−03 | 3.1051E−04 | −4.9787E−05 | 5.3512E−06 |
| S12 | −4.2146E−03 | −6.4098E−03 | 5.4691E−03 | −3.0323E−03 | 1.1742E−03 | −3.1567E−04 | 5.8168E−05 | −7.2515E−06 | 5.9939E−07 |
| S13 | −4.5246E−03 | −2.3439E−03 | 4.0287E−04 | −3.3693E−05 | 1.4110E−06 | −1.1633E−08 | −1.2852E−09 | 4.6724E−11 | −4.9963E−13 |
| S14 | 6.9200E−03 | −3.3770E−03 | 3.9060E−04 | −9.1539E−06 | −3.5617E−06 | 6.1854E−07 | −5.5978E−08 | 3.2592E−09 | −1.2523E−10 |
| S15 | −1.409E−03 | 8.5361E−05 | −9.4296E−05 | 2.8313E−05 | −3.4878E−06 | 2.4632E−07 | −1.1201E−08 | 3.4180E−10 | −7.0017E−12 |
| S16 | −7.8680E−03 | 8.7774E−04 | −1.2155E−04 | 1.4302E−05 | −1.1798E−06 | 6.6373E−08 | −2.5851E−09 | 7.0348E−11 | −1.3225E−12 |

Figure 12:
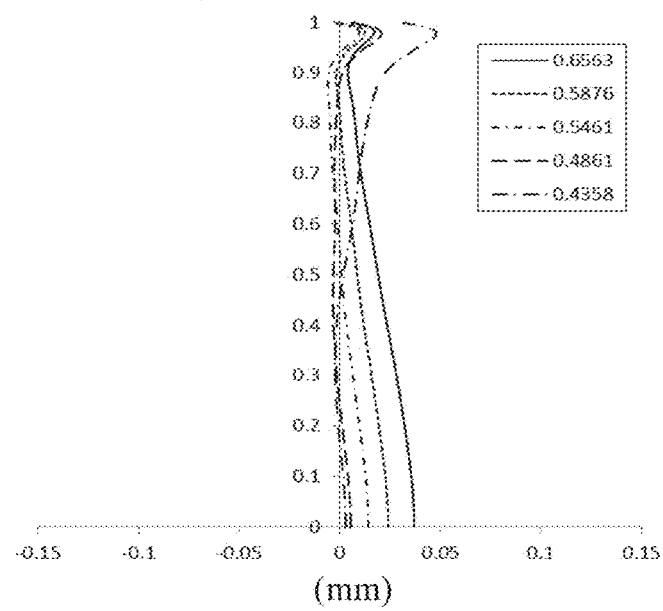
FIG. 12 illustrates a longitudinal aberration curve of the optical imaging lens assembly according to Embodiment 3 of the present disclosure.
Figure 13:
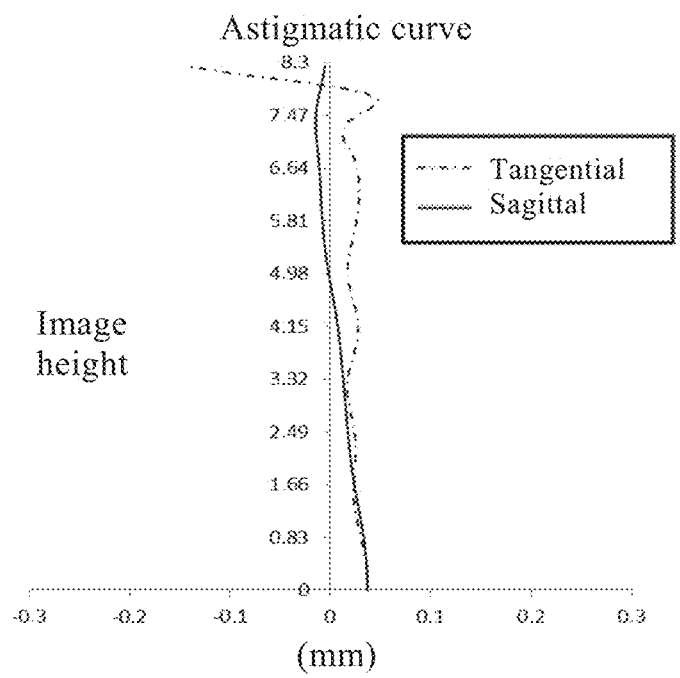
FIG. 13 illustrates an astigmatic curve of the optical imaging lens assembly according to Embodiment 3 of the present disclosure.
Figure 14:
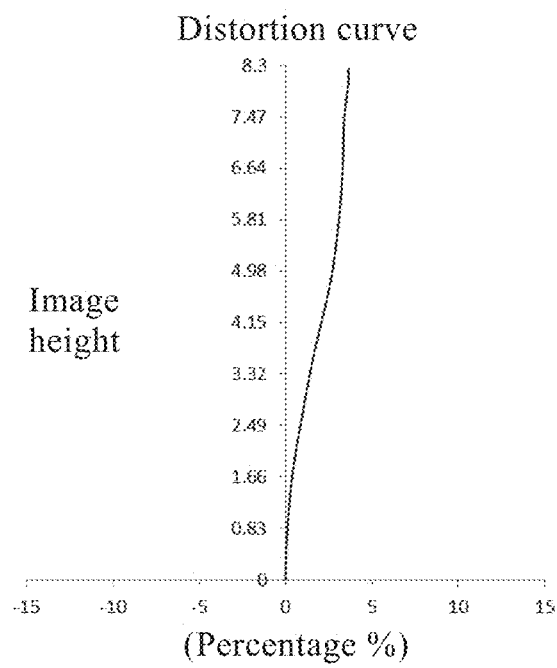
FIG. 14 illustrates a distortion curve of the optical imaging lens assembly according to Embodiment 3 of the present disclosure.
Figure 15:
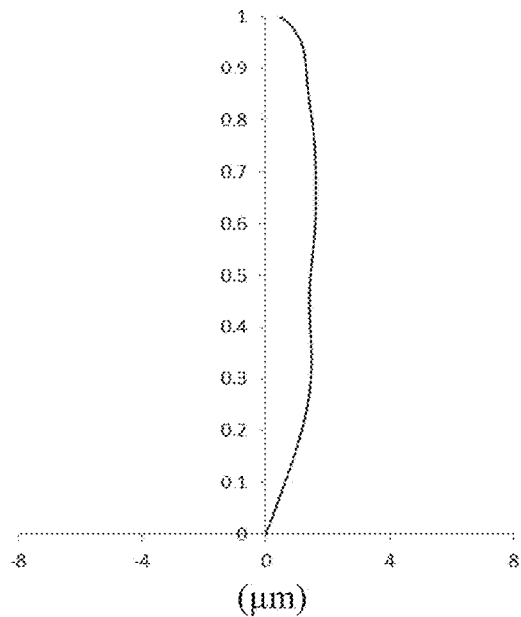
FIG. 15 illustrates a lateral color curve of the optical imaging lens assembly according to Embodiment 3 of the present disclosure.

FIG. 12 illustrates a longitudinal aberration curve of the optical imaging lens assembly according to Embodiment 3, representing deviations of focal points of light of different wavelengths converged after passing through the lens assembly. FIG. 13 illustrates an astigmatic curve of the optical imaging lens assembly according to Embodiment 3, representing a curvature of a tangential image plane and a curvature of a sagittal image plane. FIG. 14 illustrates a distortion curve of the optical imaging lens assembly according to Embodiment 3, representing amounts of distortion corresponding to different image heights. FIG. 15 illustrates a lateral color curve of the optical imaging lens assembly according to Embodiment 3, representing deviations of different image heights on the image plane after light passes through the lens assembly. It may be seen from FIGS. 12-15 that the optical imaging lens assembly according to Embodiment 3 may achieve a good imaging quality.

Embodiment 4

Figure 16:
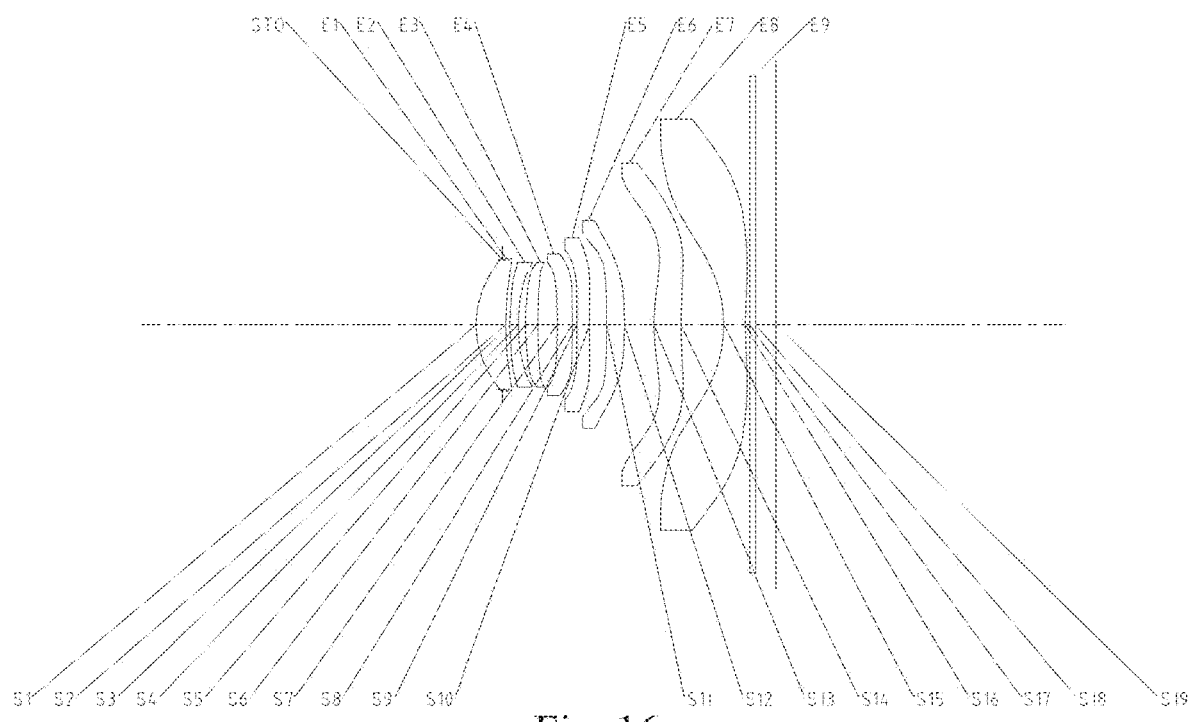
FIG. 16 is a schematic structural diagram illustrating an optical imaging lens assembly according to Embodiment 4 of the present disclosure.

An optical imaging lens assembly according to Embodiment 4 of the present disclosure is described below with reference to FIGS. 16-20. FIG. 16 is a schematic structural diagram illustrating the optical imaging lens assembly according to Embodiment 4 of the present disclosure.

As shown in FIG. 16, the optical imaging lens assembly includes, sequentially from an object side to an image side, a first lens E1, a second lens E2, a diaphragm STO, a third lens E3, a fourth lens E4, a fifth lens E5, a sixth lens E6, a seventh lens E7, an eighth lens E8, an optical filter E9 and an image plane S19.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a concave surface. The fourth lens E4 has a negative refractive power, an object-side surface S7 of the fourth lens E4 is a concave surface, and an image-side surface S8 of the fourth lens E4 is a concave surface. The fifth lens E5 has a negative refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a convex surface. The seventh lens E7 has a positive refractive power, an object-side surface S13 of the seventh lens E7 is a convex surface, and an image-side surface S14 of the seventh lens E7 is a concave surface. The eighth lens E8 has a negative refractive power, an object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the surfaces S1-S18 and finally forms an image on the image plane S19.

Table 7 is a table showing basic parameters of the optical imaging lens assembly in Embodiment 4. Here, the units of a radius of curvature and a thickness/distance are both millimeters (mm).

TABLE 7

| surface number | surface type | radius of curvature | thickness | refractive index/ abbe number | conic coefficient |
|---|---|---|---|---|---|
| OBJ | spherical | infinite | infinite | | |
| STO | spherical | infinite | −0.8300 | | |
| S1 | aspheric | 3.0628 | 0.9279 | 1.55/56.11 | −0.0051 |
| S2 | aspheric | 9.6837 | 0.1300 | | −2.1245 |
| S3 | aspheric | 9.9675 | 0.2647 | 1.68/19.25 | −0.3808 |
| S4 | aspheric | 5.7399 | 0.2265 | | −0.3273 |
| S5 | aspheric | 8.8261 | 0.3852 | 1.55/56.11 | 13.7040 |
| S6 | aspheric | 15.4069 | 0.6064 | | −14.3671 |
| S7 | aspheric | −200.0000 | 0.4764 | 1.57/37.31 | 0.0000 |
| S8 | aspheric | 500.0000 | 0.1398 | | 0.0000 |
| S9 | aspheric | 29.2909 | 0.3921 | 1.68/19.25 | 0.0000 |
| S10 | aspheric | 14.2024 | 0.5328 | | 0.0000 |
| S11 | aspheric | 154.0186 | 0.5646 | 1.57/37.31 | 0.0000 |
| S12 | aspheric | −12.5149 | 0.9169 | | 0.0000 |
| S13 | aspheric | 6.1605 | 0.8463 | 1.55/56.11 | −0.8772 |
| S14 | aspheric | 21.4050 | 1.3412 | | 0.0000 |
| S15 | aspheric | −4.0350 | 0.6753 | 1.54/55.65 | −1.3168 |
| S16 | aspheric | 13.7742 | 0.1352 | | 0.0000 |
| S17 | spherical | infinite | 0.2100 | 1.52/64.17 | |
| S18 | spherical | infinite | 0.6278 | | |
| S19 | spherical | infinite | infinite | | |

Table 8 below shows the high-order coefficients A4, A6, A8, A10, A12, A14, A16, A18 and A20 applicable to the aspheric surfaces S1-S16 in Embodiment 4.

TABLE 8

| surface number | A4 | A6 | A8 | A10 | A12 | A14 | A16 | A18 | A20 |
|---|---|---|---|---|---|---|---|---|---|
| S1 | −5.7233E−04 | 2.4435E−03 | −3.3134E−03 | 2.6526E−03 | −1.3409E−03 | 4.2558E−04 | −8.2575E−05 | 8.9118E−06 | −4.1155E−07 |
| S2 | 2.2885E−03 | −7.2178E−03 | 9.6504E−03 | −8.3262E−03 | 4.5926E−03 | −1.5854E−03 | 3.2977E−04 | −3.7699E−05 | 1.8138E−06 |
| S3 | 3.5187E−03 | −4.4559E−03 | 4.0080E−03 | −1.9690E−03 | 6.7702E−04 | −1.4055E−04 | 1.1520E−05 | 8.4894E−07 | −1.5481E−07 |
| S4 | 7.8355E−03 | −1.1444E−02 | 1.8555E−02 | −1.8293E−02 | 1.1858E−02 | −4.8913E−03 | 1.2372E−03 | −1.7473E−04 | 1.0510E−05 |
| S5 | −3.2356E−03 | −2.8794E−03 | 4.5357E−03 | −4.9366E−03 | 3.7679E−03 | −1.7683E−03 | 5.0465E−04 | −7.9181E−05 | 5.2047E−06 |
| S6 | −1.7785E−03 | −3.5087E−03 | 4.9874E−03 | −4.0394E−03 | 2.1355E−03 | −6.7826E−04 | 1.3250E−04 | −1.4964E−05 | 8.6730E−07 |
| S7 | −6.5345E−03 | −8.6832E−04 | −2.7836E−02 | 8.3016E−02 | −1.4098E−01 | 1.5756E−01 | −1.2266E−01 | 6.8196E−02 | −2.7280E−02 |
| S8 | 4.1236E−03 | −2.7974E−02 | 3.3174E−02 | −2.8960E−02 | 1.8654E−02 | −9.3679E−03 | 3.7270E−03 | −1.1657E−03 | 2.8104E−04 |
| S9 | −1.3084E−02 | −3.5445E−03 | −1.9707E−02 | 5.3357E−02 | −6.6218E−02 | 5.2148E−02 | −2.8531E−02 | 1.1203E−02 | −3.1827E−03 |
| S10 | −1.4212E−02 | −7.9524E−03 | 7.8744E−03 | −3.6422E−03 | 1.0334E−03 | −1.8566E−04 | 2.0394E−05 | −1.2415E−06 | 3.1964E−08 |
| S11 | 4.9035E−04 | −1.1654E−03 | 1.0732E−03 | −7.5029E−03 | 3.6807E−03 | −1.2509E−03 | 2.9201E−04 | −4.6346E−05 | 4.8846E−06 |
| S12 | −3.8709E−03 | −7.5651E−03 | 6.6060E−03 | −3.7064E−03 | 1.4250E−03 | −3.7674E−04 | 6.8142E−05 | −8.3470E−06 | 6.7871E−07 |
| S13 | 4.4907E−03 | −2.3294E−03 | 3.9419E−04 | −3.1854E−05 | 1.1936E−06 | 3.9043E−09 | −1.9507E−09 | 6.2393E−11 | −6.5491E−13 |
| S14 | 6.7454E−03 | −3.3347E−03 | 3.7564E−04 | −5.6057E−06 | −4.0679E−06 | 6.6500E−07 | −5.5728E−08 | 3.3566E−09 | −1.2681E−10 |
| S15 | −1.0140E−03 | −9.0427E−05 | −5.5458E−05 | 2.3250E−05 | −3.0867E−06 | 2.2659E−07 | −1.0607E−08 | 3.3184E−10 | −6.9510E−12 |
| S16 | −7.2427E−03 | 5.2847E−04 | −3.1920E−05 | 1.8524E−06 | −1.0381E−07 | 4.7234E−09 | −1.8193E−10 | 6.3483E−12 | −1.7606E−13 |

Figure 17:
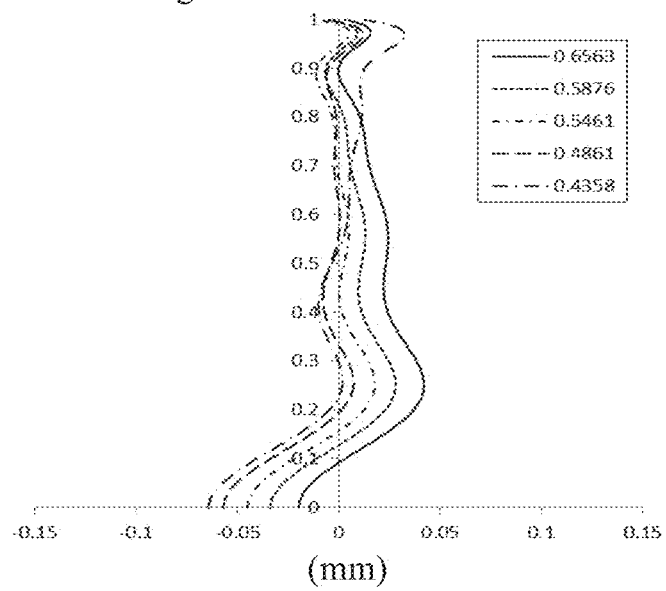
FIG. 17 illustrates a longitudinal aberration curve of the optical imaging lens assembly according to Embodiment 4 of the present disclosure.
Figure 18:
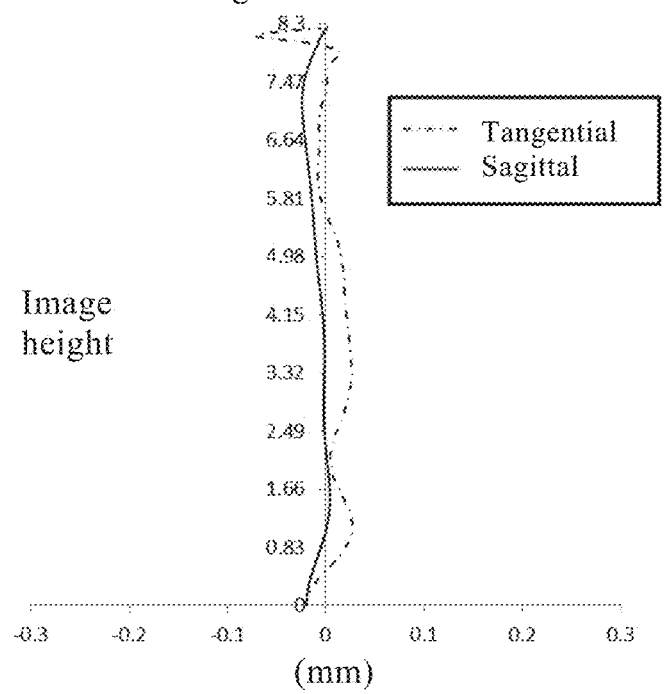
FIG. 18 illustrates an astigmatic curve of the optical imaging lens assembly according to Embodiment 4 of the present disclosure.
Figure 19:
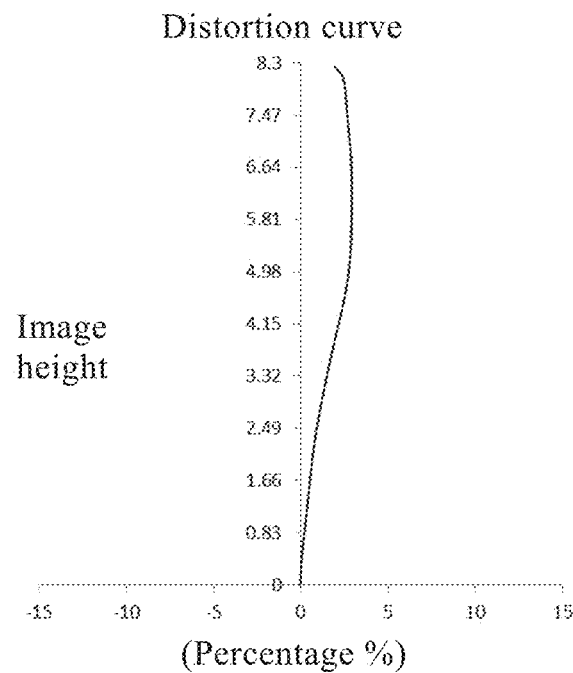
FIG. 19 illustrates a distortion curve of the optical imaging lens assembly according to Embodiment 4 of the present disclosure.
Figure 20:
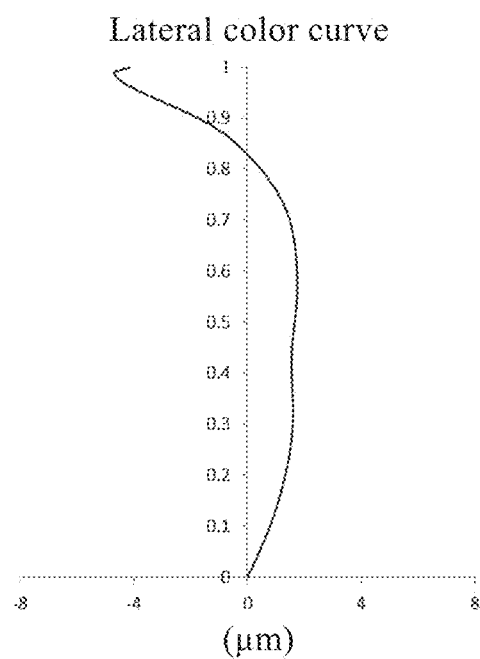
FIG. 20 illustrates a lateral color curve of the optical imaging lens assembly according to Embodiment 4 of the present disclosure.

FIG. 17 illustrates a longitudinal aberration curve of the optical imaging lens assembly according to Embodiment 4, representing deviations of focal points of light of different wavelengths converged after passing through the lens assembly. FIG. 18 illustrates an astigmatic curve of the optical imaging lens assembly according to Embodiment 4, representing a curvature of a tangential image plane and a curvature of a sagittal image plane. FIG. 19 illustrates a distortion curve of the optical imaging lens assembly according to Embodiment 4, representing amounts of distortion corresponding to different image heights. FIG. 20 illustrates a lateral color curve of the optical imaging lens assembly according to Embodiment 4, representing deviations of different image heights on the image plane after light passes through the lens assembly. It may be seen from FIGS. 17-20 that the optical imaging lens assembly according to Embodiment 4 may achieve a good imaging quality.

Embodiment 5

Figure 21:
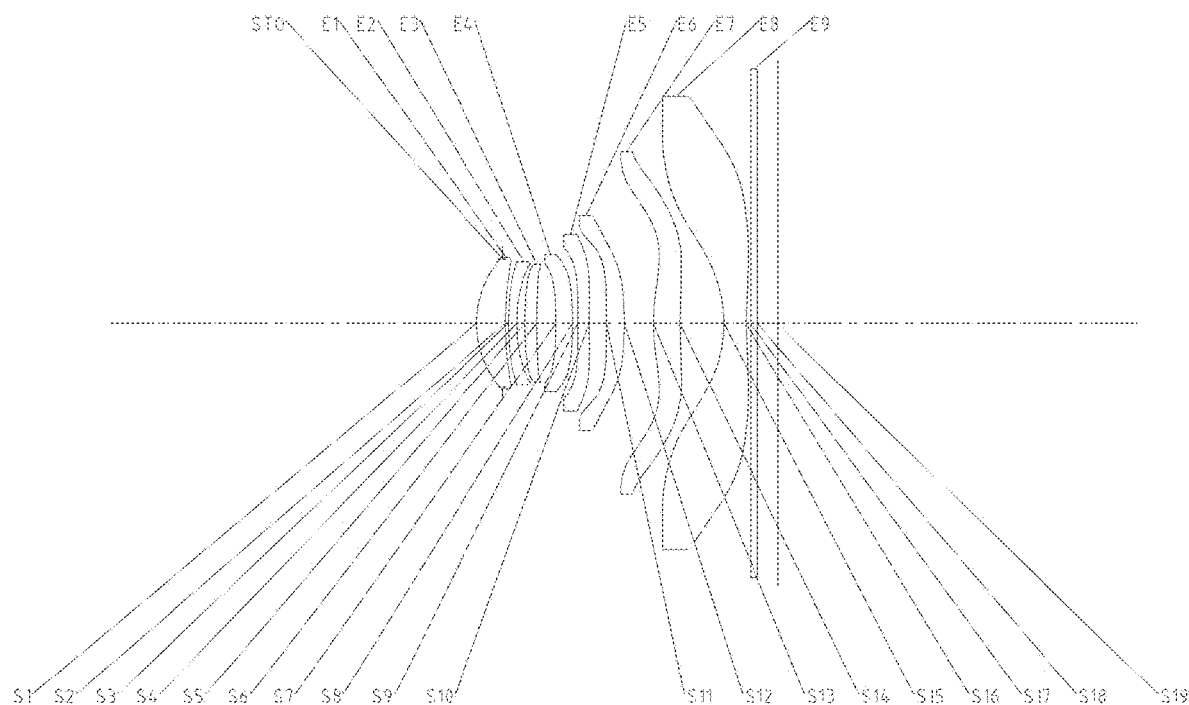
FIG. 21 is a schematic structural diagram illustrating an optical imaging lens assembly according to Embodiment 5 of the present disclosure.

An optical imaging lens assembly according to Embodiment 5 of the present disclosure is described below with reference to FIGS. 21-25. FIG. 21 is a schematic structural diagram illustrating the optical imaging lens assembly according to Embodiment 5 of the present disclosure.

As shown in FIG. 21, the optical imaging lens assembly includes, sequentially from an object side to an image side, a first lens E1, a second lens E2, a diaphragm STO, a third lens E3, a fourth lens E4, a fifth lens E5, a sixth lens E6, a seventh lens E7, an eighth lens E8, an optical filter E9 and an image plane S19.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a concave surface, and an image-side surface S8 of the fourth lens E4 is a convex surface. The fifth lens E5 has a negative refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a concave surface, and an image-side surface S12 of the sixth lens E6 is a convex surface. The seventh lens E7 has a positive refractive power, an object-side surface S13 of the seventh lens E7 is a convex surface, and an image-side surface S14 of the seventh lens E7 is a concave surface. The eighth lens E8 has a negative refractive power, an object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the surfaces S1-S18 and finally forms an image on the image plane S19.

Table 9 is a table showing basic parameters of the optical imaging lens assembly in Embodiment 5. Here, the units of a radius of curvature and a thickness/distance are both millimeters (mm).

TABLE 9

| surface number | surface type | radius of curvature | thickness | refractive index/ abbe number | conic coefficient |
| --- | --- | --- | --- | --- | --- |
| OBJ | spherical | infinite | infinite | | |
| STO | spherical | infinite | −0.8300 | | |
| S1 | aspheric | 3.0718 | 0.9045 | 1.55/56.11 | −0.0019 |
| S2 | aspheric | 9.6506 | 0.1057 | | −2.3827 |
| S3 | aspheric | 9.0870 | 0.2596 | 1.68/19.25 | −0.3976 |
| S4 | aspheric | 5.4817 | 0.2401 | | −0.2989 |
| S5 | aspheric | 8.8820 | 0.3764 | 1.55/56.11 | 13.5315 |
| S6 | aspheric | 15.7492 | 0.6059 | | −10.6847 |
| S7 | aspheric | −18.1974 | 0.5246 | 1.57/37.31 | 0.0000 |
| S8 | aspheric | −14.8393 | 0.1621 | | 0.0000 |
| S9 | aspheric | 51.7512 | 0.3495 | 1.68/19.25 | 0.0000 |
| S10 | aspheric | 14.8588 | 0.5422 | | 0.0000 |
| S11 | aspheric | −500.2584 | 0.5649 | 1.57/37.31 | 0.0000 |
| S12 | aspheric | −12.6903 | 0.9050 | | 0.0000 |
| S13 | aspheric | 6.2247 | 0.8288 | 1.55/56.11 | −0.8677 |
| S14 | aspheric | 29.2591 | 1.3831 | | 0.0000 |
| S15 | aspheric | −4.1370 | 0.6889 | 1.54/55.65 | −1.3103 |
| S16 | aspheric | 12.4032 | 0.1536 | | 0.0000 |
| S17 | spherical | infinite | 0.2100 | 1.52/64.17 | |
| S18 | spherical | infinite | 0.6461 | | |
| S19 | spherical | infinite | infinite | | |

Table 10 below shows the high-order coefficients A4, A6, A8, A10, A12, A14, A16, A18 and A20 applicable to the aspheric surfaces S1-S16 in Embodiment 5.

TABLE 10

| surface number | A4 | A6 | A8 | A10 | A12 | A14 | A16 | A18 | A20 |
| --- | --- | --- | --- | --- | --- | --- | --- | --- | --- |
| S1 | −3.9989E−03 | 2.2909E−02 | −6.5833E−02 | 1.1849E−01 | −1.4273E−01 | 1.1978E−01 | −7.1786E−02 | 3.1119E−02 | −9.7770E−03 |
| S2 | 2.3802E−03 | −1.3112E−02 | 3.7269E−02 | −7.2777E−02 | 9.5353E−02 | −8.5330E−02 | 5.3134E−02 | −2.3145E−02 | 6.9627E−03 |
| S3 | 2.0786E−03 | 7.0530E−03 | −4.6338E−02 | 1.2869E−01 | −2.1995E−01 | 2.5497E−01 | −2.0780E−01 | 1.2105E−01 | −5.0600E−02 |
| S4 | 9.5871E−03 | −3.3566E−02 | 1.2892E−01 | −3.2153E−01 | 5.3792E−01 | −6.2310E−01 | 5.1272E−01 | −3.0386E−01 | 1.3001E−01 |
| S5 | −7.1527E−03 | 3.0116E−02 | −1.2950E−01 | 3.2680E−01 | −5.4335E−01 | 6.2731E−01 | −5.1705E−01 | 3.0857E−01 | −1.3365E−01 |
| S6 | −5.0848E−04 | −1.3379E−02 | 5.7719E−02 | −1.5839E−01 | 2.8312E−01 | −3.4393E−01 | 2.9306E−01 | −1.7825E−01 | 7.7829E−02 |
| S7 | −6.4256E−03 | 1.7825E−04 | −3.4454E−02 | 1.0661E−01 | −1.8908E−01 | 2.1797E−01 | 1.7216E−01 | 9.5403E−02 | −3.7316E−02 |
| S8 | 9.3789E−03 | −6.5526E−02 | 1.5831E−01 | −2.7367E−01 | 3.3386E−01 | −2.9199E−01 | 1.8508E−01 | −8.5479E−02 | 2.8707E−02 |
| S9 | −7.1242E−03 | −3.3739E−02 | 5.2552E−02 | −5.0047E−02 | 3.3213E−02 | −1.5714E−02 | 5.1945E−03 | −1.1165E−03 | 1.1844E−04 |
| S10 | −1.1695E−02 | −1.7403E−02 | 2.2353E−02 | −1.6322E−02 | 8.3414E−03 | −3.1574E−03 | 9.0650E−04 | −1.9940E−04 | 3.3573E−05 |
| S11 | 6.3944E−04 | −8.0543E−03 | 1.9281E−03 | 2.0860E−03 | −2.5157E−03 | 1.3787E−03 | −4.7678E−04 | 1.1192E−04 | −1.8137E−05 |
| S12 | −4.0275E−03 | −4.3829E−03 | 1.4124E−03 | 4.1227E−04 | −5.3842E−04 | 2.3353E−04 | −6.0411E−05 | 1.0305E−05 | −1.1831E−06 |
| S13 | −3.8415E−03 | −2.1403E−03 | 1.6029E−04 | 1.0638E−04 | −4.3581E−05 | 8.9346E−06 | −1.1808E−06 | 1.0714E−07 | −6.8078E−09 |
| S14 | 6.5549E−03 | −2.9652E−03 | 2.3413E−04 | 3.9791E−05 | −1.4570E−05 | 2.2893E−06 | −2.2836E−07 | 1.5581E−08 | −7.4196E−10 |
| S15 | −1.5973E−03 | 3.0020E−04 | −1.8304E−04 | 4.8541E−05 | −6.4450E−06 | 5.3929E−07 | −3.1456E−08 | 1.3350E−09 | −4.1713E−11 |
| S16 | −7.1944E−03 | 8.1825E−04 | −1.2536E−04 | 1.7372E−05 | −1.7637E−06 | 1.2856E−07 | −6.8393E−09 | 2.6748E−10 | −7.6469E−12 |

Figure 22:
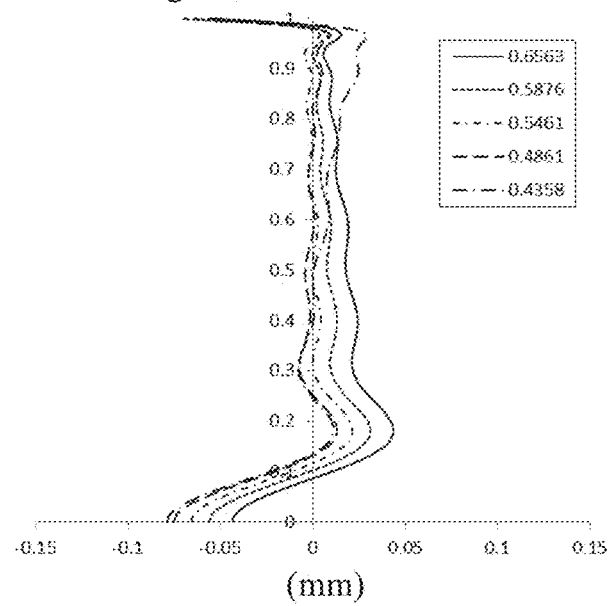
FIG. 22 illustrates a longitudinal aberration curve of the optical imaging lens assembly according to Embodiment 5 of the present disclosure.
Figure 23:
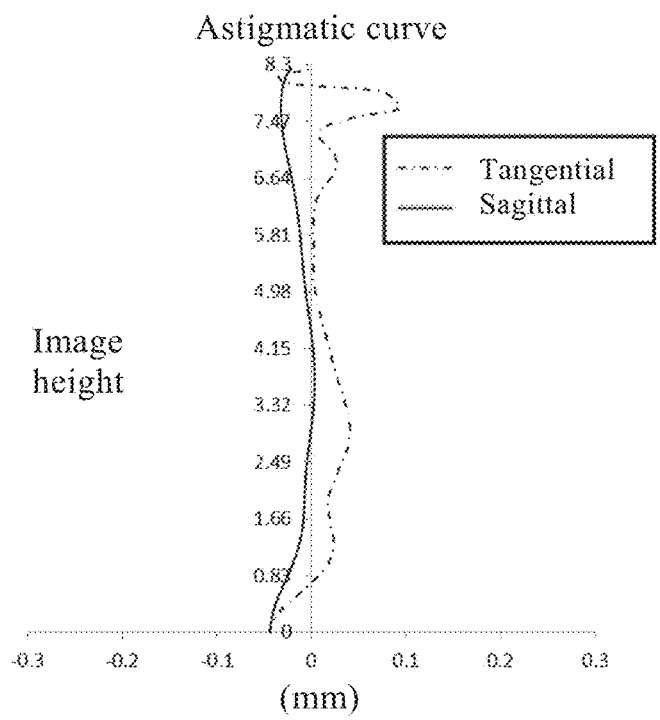
FIG. 23 illustrates an astigmatic curve of the optical imaging lens assembly according to Embodiment 5 of the present disclosure.
Figure 24:
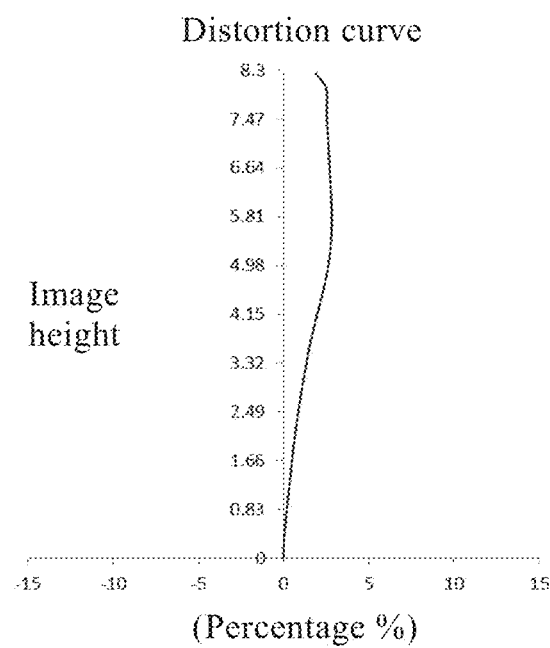
FIG. 24 illustrates a distortion curve of the optical imaging lens assembly according to Embodiment 5 of the present disclosure.
Figure 25:
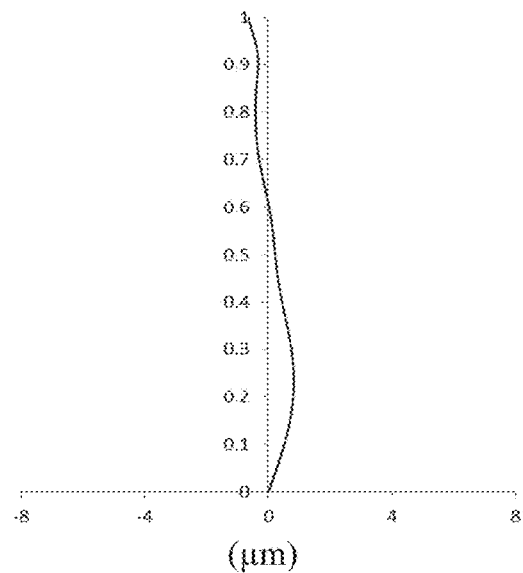
FIG. 25 illustrates a lateral color curve of the optical imaging lens assembly according to Embodiment 5 of the present disclosure.

FIG. 22 illustrates a longitudinal aberration curve of the optical imaging lens assembly according to Embodiment 5, representing deviations of focal points of light of different wavelengths converged after passing through the lens assembly. FIG. 23 illustrates an astigmatic curve of the optical imaging lens assembly according to Embodiment 5, representing a curvature of a tangential image plane and a curvature of a sagittal image plane. FIG. 24 illustrates a distortion curve of the optical imaging lens assembly according to Embodiment 5, representing amounts of distortion corresponding to different image heights. FIG. 25 illustrates a lateral color curve of the optical imaging lens assembly according to Embodiment 5, representing deviations of different image heights on the image plane after light passes through the lens assembly. It may be seen from FIGS. 22-25 that the optical imaging lens assembly according to Embodiment 5 may achieve a good imaging quality.

Embodiment 6

Figure 26:
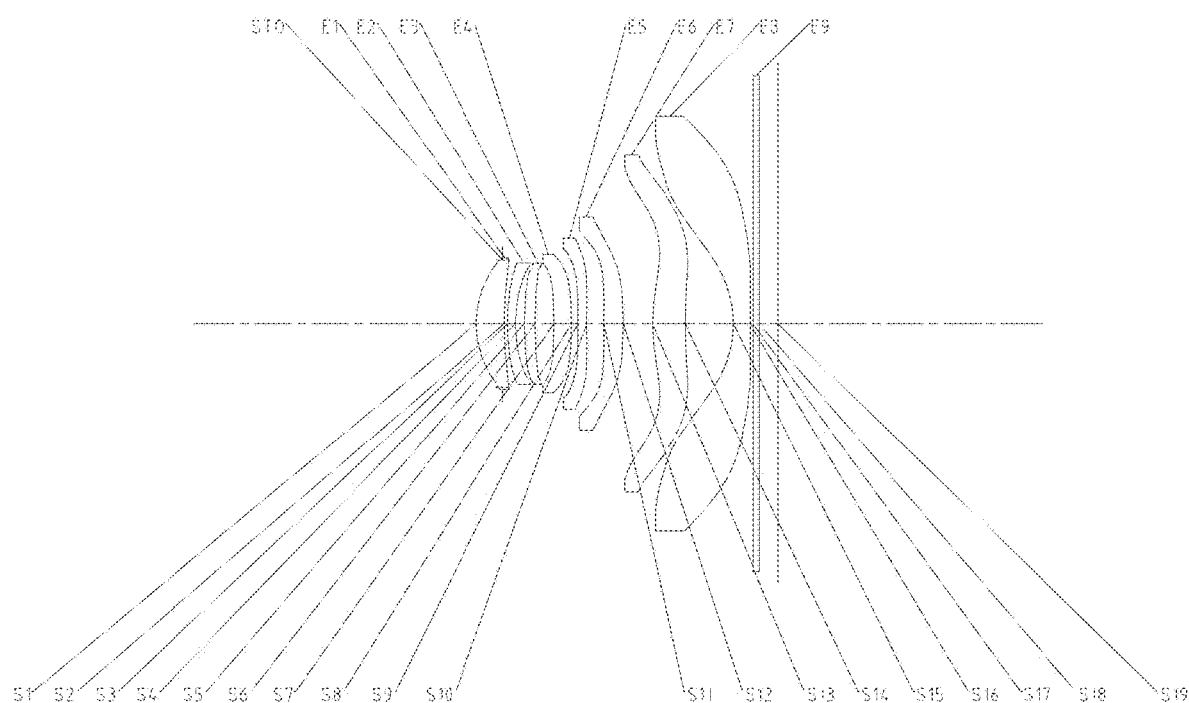
FIG. 26 is a schematic structural diagram illustrating an optical imaging lens assembly according to Embodiment 6 of the present disclosure.

An optical imaging lens assembly according to Embodiment 6 of the present disclosure is described below with reference to FIGS. 26-30. FIG. 26 is a schematic structural diagram illustrating the optical imaging lens assembly according to Embodiment 6 of the present disclosure.

As shown in FIG. 26, the optical imaging lens assembly includes, sequentially from an object side to an image side, a first lens E1, a second lens E2, a diaphragm STO, a third lens E3, a fourth lens E4, a fifth lens E5, a sixth lens E6, a seventh lens E7, an eighth lens E8, an optical filter E9 and an image plane S19.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a concave surface, and an image-side surface S8 of the fourth lens E4 is a convex surface. The fifth lens E5 has a negative refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a convex surface. The seventh lens E7 has a positive refractive power, an object-side surface S13 of the seventh lens E7 is a convex surface, and an image-side surface S14 of the seventh lens E7 is a concave surface. The eighth lens E8 has a negative refractive power, an object-side surface S15 of the eighth lens E8 is a concave surface, and an image-side surface S16 of the eighth lens E8 is a convex surface. The optical filter E9 has an object-side surface S17 and an image-side surface S18. Light from an object sequentially passes through the surfaces S1-S18 and finally forms an image on the image plane S19.

Table 11 is a table showing basic parameters of the optical imaging lens assembly in Embodiment 6. Here, the units of a radius of curvature and a thickness/distance are both millimeters (mm).

TABLE 11

| surface number | surface type | radius of curvature | thickness | refractive index/ abbe number | conic coefficient |
|---|---|---|---|---|---|
| OBJ | spherical | infinite | infinite | | |
| STO | spherical | infinite | −0.8300 | | |
| S1 | aspheric | 3.1410 | 0.8787 | 1.55/56.11 | −0.0233 |
| S2 | aspheric | 11.2784 | 0.1050 | | −4.4708 |
| S3 | aspheric | 7.6988 | 0.2500 | 1.68/19.25 | −0.6381 |
| S4 | aspheric | 4.8996 | 0.2733 | | −0.3297 |
| S5 | aspheric | 9.2076 | 0.3375 | 1.55/56.11 | 13.7546 |
| S6 | aspheric | 12.6516 | 0.5941 | | −7.4637 |
| S7 | aspheric | −24.3473 | 0.5457 | 1.57/37.31 | 0.0000 |
| S8 | aspheric | −14.6449 | 0.2003 | | 0.0000 |
| S9 | aspheric | 156.3386 | 0.2765 | 1.68/19.25 | 0.0000 |
| S10 | aspheric | 16.2884 | 0.5328 | | 0.0000 |
| S11 | aspheric | 94.5216 | 0.6077 | 1.57/37.31 | 0.0000 |
| S12 | aspheric | −14.3738 | 0.9207 | | 0.0000 |
| S13 | aspheric | 5.9838 | 1.0182 | 1.55/56.11 | −0.9815 |
| S14 | aspheric | 18.9409 | 1.5108 | | 0.0000 |
| S15 | aspheric | −3.2629 | 0.5297 | 1.54/55.65 | −1.3866 |
| S16 | aspheric | −500.0000 | 0.0887 | | 0.0000 |
| S17 | spherical | infinite | 0.2100 | 1.52/64.17 | |
| S18 | spherical | infinite | 0.5812 | | |
| S19 | spherical | infinite | infinite | | |

Table 12 below shows the high-order coefficients A4, A6, A8, A10, A12, A14, A16, A18 and A20 applicable to the aspheric surfaces S1-S16 in Embodiment 6.

TABLE 12

| surface number | A4 | A6 | A8 | A10 | A12 | A14 | A16 | A18 | A20 |
|---|---|---|---|---|---|---|---|---|---|
| S1 | −1.7477E−04 | 1.1900E−03 | −1.7180E−03 | 1.3915E−03 | −7.0359E−04 | 2.1893E−04 | −4.0922E−05 | 4.1542E−06 | −1.7635E−07 |
| S2 | −2.5193E−03 | 2.6877E−05 | 2.0163E−03 | −2.2673E−03 | 1.3887E−03 | −5.2843E−04 | 1.2240E−04 | −1.5836E−05 | 8.8066E−07 |
| S3 | −1.8718E−03 | 1.6055E−03 | 1.7390E−03 | −2.2831E−03 | 1.5302E−03 | −6.3965E−04 | 1.6338E−04 | −2.3436E−05 | 1.4674E−06 |
| S4 | 2.2311E−03 | 6.9270E−04 | 2.3910E−03 | −3.1195E−03 | 2.4762E−03 | −1.2257E−03 | 3.7069E−04 | −6.2692E−05 | 4.5311E−06 |
| S5 | −4.2408E−03 | −8.9837E−04 | 1.3667E−03 | −1.3420E−03 | 1.1640E−03 | −5.7556E−04 | 1.7219E−04 | −2.7813E−05 | 1.8174E−06 |
| S6 | −2.3240E−03 | 1.8863E−04 | −2.3107E−03 | 4.0078E−03 | −3.4559E−03 | 1.8250E−03 | −5.6759E−04 | 9.6449E−05 | −6.8487E−06 |
| S7 | −7.7327E−03 | −1.4869E−03 | −3.3412E−03 | 3.0302E−03 | −1.5578E−03 | 4.2489E−04 | −4.2305E−05 | −4.4181E−06 | 9.7168E−07 |
| S8 | −1.6787E−03 | −7.7225E−03 | 5.2310E−03 | −4.1054E−03 | 2.0104E−03 | −6.2662E−04 | 1.2628E−04 | −1.5091E−05 | 7.9990E−07 |
| S9 | −1.4869E−02 | −4.2389E−03 | 4.9073E−03 | −1.9770E−03 | 1.1887E−04 | 1.5847E−04 | −5.3270E−05 | 6.9244E−06 | −3.3725E−07 |
| S10 | −1.6294E−02 | −5.2064E−03 | 6.0185E−03 | −2.7923E−03 | 7.4135E−04 | −1.1596E−04 | 1.0123E−05 | −4.2166E−07 | 5.1176E−09 |
| S11 | 7.8269E−04 | −5.8868E−03 | 1.0662E−03 | 2.0336E−03 | −1.6140E−03 | 7.1753E−04 | −2.0816E−04 | 4.0580E−05 | −5.2617E−06 |
| S12 | −9.8860E−04 | −5.9243E−03 | 2.8932E−03 | −1.1261E−03 | 3.4226E−04 | −7.4120E−05 | 1.0817E−05 | −1.0054E−06 | 5.3978E−08 |
| S13 | −3.1401E−03 | −1.8354E−03 | 2.4021E−04 | −1.1359E−05 | −2.3290E−07 | 5.3123E−08 | −2.5009E−09 | 5.2160E−11 | −4.1930E−13 |
| S14 | 4.3564E−03 | −2.1623E−03 | 1.4338E−04 | 3.9479E−06 | 1.7330E−06 | −9.0462E−07 | 1.5445E−07 | −1.5165E−08 | 9.7066E−10 |
| S15 | 8.2579E−03 | −5.8311E−03 | 1.4885E−03 | −2.1436E−04 | 2.0242E−05 | −1.3131E−06 | 5.9358E−08 | −1.8654E−09 | 3.9944E−11 |
| S16 | 8.8338E−03 | −4.8987E−03 | 9.7911E−04 | −1.1328E−04 | 8.5461E−06 | −4.4102E−07 | 1.5829E−08 | −3.9412E−10 | 6.6632E−12 |

Figure 27:
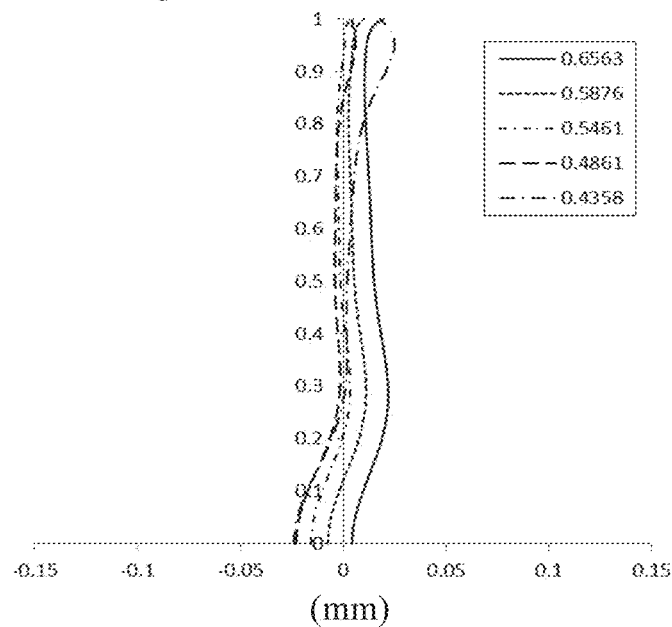
FIG. 27 illustrates a longitudinal aberration curve of the optical imaging lens assembly according to Embodiment 6 of the present disclosure.
Figure 28:
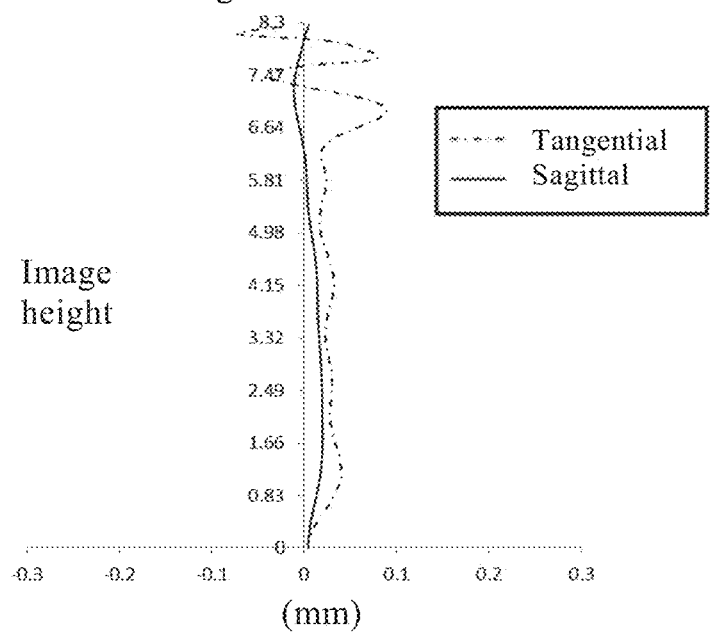
FIG. 28 illustrates an astigmatic curve of the optical imaging lens assembly according to Embodiment 6 of the present disclosure.
Figure 29:
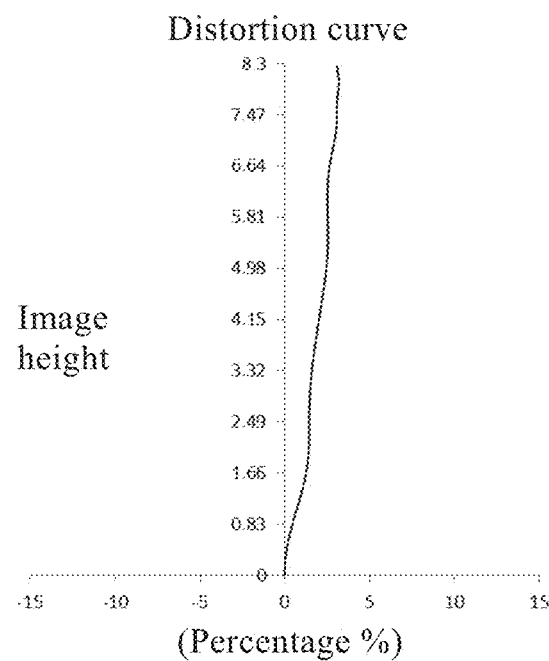
FIG. 29 illustrates a distortion curve of the optical imaging lens assembly according to Embodiment 6 of the present disclosure.
Figure 30:
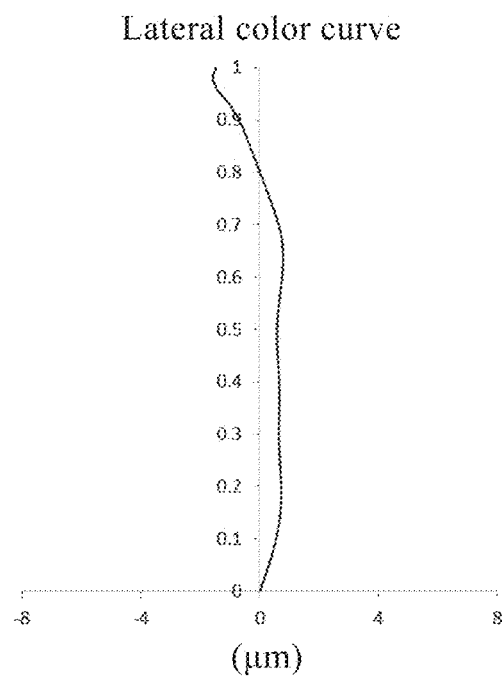
FIG. 30 illustrates a lateral color curve of the optical imaging lens assembly according to Embodiment 6 of the present disclosure.

FIG. 27 illustrates a longitudinal aberration curve of the optical imaging lens assembly according to Embodiment 6, representing deviations of focal points of light of different wavelengths converged after passing through the lens assembly. FIG. 28 illustrates an astigmatic curve of the optical imaging lens assembly according to Embodiment 6, representing a curvature of a tangential image plane and a curvature of a sagittal image plane. FIG. 29 illustrates a distortion curve of the optical imaging lens assembly according to Embodiment 6, representing amounts of distortion corresponding to different image heights. FIG. 30 illustrates a lateral color curve of the optical imaging lens assembly according to Embodiment 6, representing deviations of different image heights on the image plane after light passes through the lens assembly. It may be seen from FIGS. 27-30 that the optical imaging lens assembly according to Embodiment 6 may achieve a good imaging quality.

In summary, the optical parameters of Embodiments 1-6 are shown in Table 13 below, and respectively satisfy the relationships shown in Table 14.

TABLE 13

| parameter | embodiment | | | | | |
|---|---|---|---|---|---|---|
| | 1 | 2 | 3 | 4 | 5 | 6 |
| TTL (mm) | 8.15 | 8.57 | 8.42 | 8.47 | 8.55 | 8.58 |
| ImgH (mm) | 8.25 | 8.25 | 8.25 | 8.25 | 8.25 | 8.25 |
| FOV (°) | 45.15 | 44.96 | 44.35 | 45.03 | 45.07 | 45.10 |
| Fno | 1.98 | 1.98 | 1.98 | 1.98 | 1.98 | 1.98 |
| f (mm) | 8.00 | 8.02 | 8.16 | 8.00 | 7.95 | 7.94 |
| f1 (mm) | 7.82 | 7.06 | 7.58 | 7.81 | 7.86 | 7.67 |
| f2 (mm) | −18.74 | −20.80 | −18.74 | −20.43 | −20.94 | −20.57 |
| f3 (mm) | 32.89 | −500.00 | 35.48 | 37.04 | 36.57 | 59.82 |
| f4 (mm) | 66.36 | 40.55 | −503.98 | −250.02 | 133.20 | 63.04 |
| f5 (mm) | −35.25 | −25.95 | −40.60 | −41.00 | −30.79 | −26.78 |
| f6 (mm) | 22.89 | 21.46 | 20.89 | 20.29 | 22.78 | 21.89 |
| f7 (mm) | 13.35 | 9.75 | 9.53 | 9.26 | 8.88 | 9.77 |
| f8 (mm) | −5.45 | −5.68 | −5.65 | −5.63 | −5.59 | −6.01 |

TABLE 14

| conditional expression | embodiment | | | | | |
|---|---|---|---|---|---|---|
| | 1 | 2 | 3 | 4 | 5 | 6 |
| tan(FOV/2)*f | 8.04 | 8.01 | 7.98 | 8.01 | 7.97 | 7.97 |
| TTL/ImgH | 0.99 | 1.04 | 1.02 | 1.03 | 1.04 | 1.04 |
| f/f2 | −0.43 | −0.39 | −0.44 | −0.39 | −0.38 | −0.39 |
| f/(f5 + f6) | −0.65 | −1.79 | −0.41 | −0.39 | −0.99 | −1.62 |
| |(R7 + R8)/f4| | 0.53 | 1.13 | 0.09 | 1.20 | 0.25 | 0.62 |
| SAG72/SAG71 | 1.29 | 1.45 | 1.32 | 1.37 | 1.47 | 1.68 |
| T56/T67 | 0.69 | 0.55 | 0.64 | 0.58 | 0.60 | 0.58 |
| (R14 − R13)/(R14 + R13) | 0.45 | 0.54 | 0.52 | 0.55 | 0.65 | 0.52 |
| R15/f8 | 0.66 | 0.74 | 0.71 | 0.72 | 0.74 | 0.54 |
| CT8/CT7 | 0.58 | 0.75 | 0.93 | 0.80 | 0.83 | 0.52 |
| DT61/DT71 | 0.69 | 0.60 | 0.63 | 0.62 | 0.58 | 0.59 |

The present disclosure further provides an imaging apparatus having an electronic photosensitive element which may be a photosensitive charge-coupled device (CCD) or complementary metal-oxide semiconductor element (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description for the embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

What is claimed is:

1. An optical imaging lens assembly, comprising, sequentially along an optical axis from an object side to an image side:
   a first lens, having a refractive power;
   a second lens, having a refractive power;
   a third lens, having a refractive power;
   a fourth lens, having a refractive power, an object-side surface of the fourth lens being a concave surface;
   a fifth lens, having a negative refractive power, an object-side surface of the fifth lens being a convex surface;
   a sixth lens, having a refractive power;
   a seventh lens, having a refractive power; and
   an eighth lens, having a refractive power,
   wherein a maximal field-of-view FOV of the optical imaging lens assembly and an effective focal length f of the optical imaging lens assembly satisfy: tan(FOV/2)× f>7.68 mm.

2. The optical imaging lens assembly according to claim 1, wherein a maximal effective radius DT61 of an object-side surface of the sixth lens and a maximal effective radius DT71 of an object-side surface of the seventh lens satisfy: DT61/DT71≤0.69.

3. The optical imaging lens assembly according to claim 1, wherein an axial distance SAG71 between an intersection point of the object-side surface of the seventh lens and the optical axis and a vertex of an effective radius of the object-side surface of the seventh lens and an axial distance SAG72 between an intersection point of an image-side surface of the seventh lens and the optical axis and a vertex of an effective radius of the image-side surface of the seventh lens satisfy: 1<SAG72/SAG71<1.9.

4. The optical imaging lens assembly according to claim 1, wherein a radius of curvature R7 of the object-side surface of the fourth lens, a radius of curvature R8 of an image-side surface of the fourth lens and an effective focal length f4 of the fourth lens satisfy: 0<|(R7+R8)/f4|<1.4.

5. The optical imaging lens assembly according to claim 1, wherein the effective focal length f of the optical imaging lens assembly and an effective focal length f2 of the second lens satisfy: −0.6<f/f2<−0.2.

6. The optical imaging lens assembly according to claim 1, wherein the effective focal length f of the optical imaging lens assembly, an effective focal length f5 of the fifth lens and an effective focal length f6 of the sixth lens satisfy: −2<f/(f5+f6)<−0.1.

7. The optical imaging lens assembly according to claim 1, wherein an air spacing T56 on the optical axis between the fifth lens and the sixth lens and an air spacing T67 on the optical axis between the sixth lens and the seventh lens satisfy: 0.3<T56/T67<0.8.

8. The optical imaging lens assembly according to claim 1, wherein a center thickness CT7 of the seventh lens on the optical axis and a center thickness CT8 of the eighth lens on the optical axis satisfy: 0.2<CT8/CT7≤0.93.

9. The optical imaging lens assembly according to claim 1, wherein a radius of curvature R13 of the object-side surface of the seventh lens and a radius of curvature R14 of the image-side surface of the seventh lens satisfy: $0.2<(R14-R13)/(R14+R13)<0.8$.

10. The optical imaging lens assembly according to claim 1, wherein a radius of curvature R15 of an object-side surface of the eighth lens and an effective focal length f8 of the eighth lens satisfy: $0.3<R15/f8<0.9$.

11. The optical imaging lens assembly according to claim 1, wherein a distance TTL on the optical axis from an object-side surface of the first lens to an image plane and half of a diagonal length ImgH of an effective pixel area on the image plane satisfy: $TTL/ImgH<1.11$.

12. An optical imaging lens assembly, comprising, sequentially along an optical axis from an object side to an image side:
- a first lens, having a refractive power;
- a second lens, having a refractive power;
- a third lens, having a refractive power;
- a fourth lens, having a refractive power, an object-side surface of the fourth lens being a concave surface;
- a fifth lens, having a negative refractive power, an object-side surface of the fifth lens being a convex surface;
- a sixth lens, having a refractive power;
- a seventh lens, having a refractive power; and
- an eighth lens, having a refractive power, wherein a distance TTL on the optical axis from an object-side surface of the first lens to an image plane and half of a diagonal length ImgH of an effective pixel area on the image plane satisfy: $TTL/ImgH<1.11$.

13. The optical imaging lens assembly according to claim 12, wherein a maximal effective radius DT61 of an object-side surface of the sixth lens and a maximal effective radius DT71 of an object-side surface of the seventh lens satisfy: $DT61/DT71 \leq 0.69$.

14. The optical imaging lens assembly according to claim 12, wherein an axial distance SAG71 between an intersection point of the object-side surface of the seventh lens and the optical axis and a vertex of an effective radius of the object-side surface of the seventh lens and an axial distance SAG72 between an intersection point of an image-side surface of the seventh lens and the optical axis and a vertex of an effective radius of the image-side surface of the seventh lens satisfy: $1<SAG72/SAG71<1.9$.

15. The optical imaging lens assembly according to claim 12, wherein a radius of curvature R7 of the object-side surface of the fourth lens, a radius of curvature R8 of an image-side surface of the fourth lens and an effective focal length f4 of the fourth lens satisfy: $0<|(R7+R8)/f4|<1.4$.

16. The optical imaging lens assembly according to claim 12, wherein an effective focal length f of the optical imaging lens assembly and an effective focal length f2 of the second lens satisfy: $-0.6<f/f2<-0.2$.

17. The optical imaging lens assembly according to claim 12, wherein the effective focal length f of the optical imaging lens assembly, an effective focal length f5 of the fifth lens and an effective focal length f6 of the sixth lens satisfy: $-2<f/(f5+f6)<-0.1$.

18. The optical imaging lens assembly according to claim 12, wherein an air spacing T56 on the optical axis between the fifth lens and the sixth lens and an air spacing T67 on the optical axis between the sixth lens and the seventh lens satisfy: $0.3<T56/T67<0.8$.

19. The optical imaging lens assembly according to claim 12, wherein a center thickness CT7 of the seventh lens on the optical axis and a center thickness CT8 of the eighth lens on the optical axis satisfy: $0.2<CT8/CT7 \leq 0.93$.

20. The optical imaging lens assembly according to claim 12, wherein a radius of curvature R13 of the object-side surface of the seventh lens and a radius of curvature R14 of the image-side surface of the seventh lens satisfy: $0.2<(R14-R13)/(R14+R13)<0.8$.

* * * * *